United States Patent
Todoroki

(10) Patent No.: US 6,219,445 B1
(45) Date of Patent: Apr. 17, 2001

(54) MULTI-COLOR IMAGE ENCODING AND/OR DECODING APPARATUS CONTAINING COLOR ORDER TABLE AND THE METHOD THEREOF

(75) Inventor: Akinari Todoroki, Hachioji (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 09/006,204

(22) Filed: Jan. 13, 1998

(30) Foreign Application Priority Data

Jan. 14, 1997 (JP) .................................................. 9-005007

(51) Int. Cl.$^7$ ...................................................... G06K 9/00
(52) U.S. Cl. ......................... 382/166; 382/238; 382/247; 382/233
(58) Field of Search ..................................... 382/162, 164, 382/166, 167, 238–240, 245–247, 232, 233; 358/261.1, 261.2, 514

(56) References Cited

U.S. PATENT DOCUMENTS

| | | |
|---|---|---|
| 3,739,085 | 6/1973 | Rosen et al. ............................... 178/6 |
| 4,325,085 | 4/1982 | Gooch .................................. 358/261 |
| 4,344,086 | 8/1982 | Mizuno ................................. 358/261 |
| 4,652,856 | 3/1987 | Mohiuddin et al. .................. 235/310 |
| 4,905,297 | 2/1990 | Langdon, Jr. et al. ........... 358/261.2 |
| 4,935,882 | 6/1990 | Pennebaker et al. ................ 364/554 |
| 5,317,428 | 5/1994 | Osawa et al. ......................... 358/539 |
| 5,809,176 | * 9/1998 | Yajima ................................. 382/247 |
| 5,859,926 | * 1/1999 | Asahi et al. ......................... 382/247 |
| 5,963,672 | * 10/1999 | Yajima et al. ........................ 382/247 |

FOREIGN PATENT DOCUMENTS

| | | |
|---|---|---|
| 62-185413 | 8/1987 | (JP) . |
| 63-76525 | 4/1988 | (JP) . |
| 63-74324 | 4/1988 | (JP) . |
| 63-76525 | 4/1988 | (JP) . |
| 5-328142 | 12/1993 | (JP) . |
| 6-276041 | 9/1994 | (JP) . |

OTHER PUBLICATIONS

Joint Bi–level Image Expert Group (JBIG) International Standard ISO/IEC DIS 11544), 1992.

* cited by examiner

Primary Examiner—Bhavesh Mehta
(74) Attorney, Agent, or Firm—Oliff & Berridge, PLC

(57) ABSTRACT

A multi-color image encoding apparatus is provided that contains a color order table which is created by combining a upper two-dimensional color order table composing a two-dimensional perimeter pixel data and a one-dimensional color order table for lower color orders which are created by latest appearance table that moves the color order of the color symbol corresponding to the color pixel data most recently input to an uppermost line. Moreover, an escape symbol generation device may be provided to output an escape symbol for the order corresponding to the color symbols equal to or lower than the predetermined number, when the total of the color symbol in the upper color order and the color symbol in the lower color order becomes equal to or greater than a predetermined number. Furthermore, when the color symbols overlap in both tables, the symbols are not deleted from the one-dimensional color order table. Moreover, creative measure is taken to make the reference pixels for degenerating different from the perimeter pixels for the two-dimensional color order table.

22 Claims, 20 Drawing Sheets

| STATUS | CX (STATUS SIGNAL) | NUMBER OF COLORS |
|---|---|---|
| A=B=C=D | 0 | 1 |
| A=B=C≠D | 1 | 2 |
| A=B=D≠C | 1 | 2 |
| A=C=D≠B | 1 | 2 |
| B=C=D≠A | 1 | 2 |
| A=B C=D B≠C | 1 | 2 |
| A=C B=D B≠C | 1 | 2 |
| A=D B=C B≠D | 1 | 2 |
| A=B A≠C A≠D C≠D | 2 | 3 |
| A=C A≠B A≠D B≠D | 2 | 3 |
| A=D A≠B A≠C B≠C | 2 | 3 |
| B=C A≠B B≠D A≠C | 2 | 3 |
| B=D A≠B B≠C A≠C | 2 | 3 |
| A≠B A≠C A≠D B≠C B≠D C≠D | 3 | 4 |

Cn: COLOR SYMBOL
(n: 0~255)

| | COLOR ORDER | POSITION | COLOR SYMBOL |
|---|---|---|---|
| TWO-DIMENSIONAL COLOR ORDER TABLE | 0th ORDER | P0 | C4 |
| | 1st ORDER | P1 | C3 |
| | 2nd ORDER | P2 | C5 |
| | 3rd ORDER | P3 | C6 |

FIG. 6

| | COLOR ORDER | POSITION | COLOR SYMBOL |
|---|---|---|---|
| ONE-DIMENSIONAL COLOR ORDER TABLE | 0th ORDER | T0 = P0 | C4 |
| | 1st ORDER | T1 = T2 = T4 | C2 |
| | 2nd ORDER | T3 | C5 |
| | 3rd ORDER | T5 | C8 |
| | . | . | . |
| | . | . | . |
| | . | . | . |
| | 255th ORDER | | |

FIG. 7

| LATEST APPEARANCE TABLE | COLOR SYMBOL | POSITION | CODE |
|---|---|---|---|
| 0 th ORDER | C4 | P0 = T0 | 0 |
| 1 st ORDER | C3 | P1 | 1 |
| 2 nd ORDER | C5 | P2 | 2 |
| 3 rd ORDER | C6 | P3 | 3 |
| 4 th ORDER | C2 | T1 | 4 |
| 5 th ORDER | C5 | . | 5 |
| 6 th ORDER | C8 | . | 6 |
| . | . | . | 7 |
| . | . | . | |
| . | . | . | |
| 15 th ORDER | Cn | . | |
| . | . | . | |
| . | . | . | |
| . | . | . | |
| 255 th ORDER | . | T252 | esc + 0 |
| 256 th ORDER | . | T253 | esc + 1 |
| 257 th ORDER | . | T254 | esc + 2 |
| 258 th ORDER | . | T255 | esc + 3 |

FIG. 8

| | INDEX | APPEARANCE FREQUENCY OF EACH COLOR | | | | | | P |
|---|---|---|---|---|---|---|---|---|
| | | A | B | C | D | E | | |
| REFERENCE PIXEL PATTERN | 0 | 64,936 | 15,882 | 26,320 | 7,669 | 5,634 | | 2,634 |
| | 1 | 5,553 | 36,214 | 18,776 | 20,365 | 6,046 | | 953 |
| | 2 | 33,365 | 18,247 | 22,563 | 4,423 | 10,012 | | 1,359 |
| | 3 | 9,569 | 33 | 13,456 | 562 | 356 | | 224 |
| | 4 | 11,236 | 36,877 | 25,650 | 1,096 | 532 | | 1,096 |
| | 65535 | 4,963 | 15,689 | 45,678 | 2,236 | 3,326 | | 63,697 |

A, B, C, ............ P: COLOR SYMBOLS

X: ENCODING TARGET PIXEL
A, B, C,: REFERENCE PIXELS

| CONDITION | Sx |
|---|---|
| A = B = C | S1 |
| A = B ≠ C | S2 |
| A = C ≠ B | S3 |
| A ≠ B = C | S4 |
| A ≠ B ≠ C | S5 |

LATEST APPEARANCE TABLE

| COLOR ORDER | COLOR SYMBOL |
|---|---|
| 1ST ORDER | C4 |
| 2ND ORDER | C3 |
| 3RD ORDER | C6 |
| 4TH ORDER | C5 |
| 5TH ORDER | C2 |
| 6TH ORDER | C0 |
| 7TH ORDER | C8 |
| ⋮ | |
| 16TH ORDER | Cn |

FIG. 23C

MULTI-COLOR IMAGE ENCODING AND/OR DECODING APPARATUS CONTAINING COLOR ORDER TABLE AND THE METHOD THEREOF

BACKGROUND OF THE INVENTION

1. Field of Invention

The present invention relates to a multi-color image encoding and/or decoding apparatus and its method. More particularly, the present invention relates to color order transformation of an index which is attached during encoding and decoding the multi-color image.

2. Description of Related Art

Multi-color images have been used in personal computers, game machines and the like. A multi-color image is also called a representative color image or a limited color image. As shown in FIG. 22, a multi-color image is an image in which an index is attached to a specific color, namely a color having a specific R(red), G(green) and B(blue) value, and using the index data to express the image by limited representative colors consisting of 16,256 colors.

This type of multi-color image data requires a total of 24 bits assuming that each of R, G, and B color is displayed by 8 bits (256 types). However, because an index is also displayed by 8 bits, the data compression rate is substantial. Despite the compression, the information volume is still very large, which makes the communication of data too slow to be practical if the data is processed without any change. Hence, compression technology of multi-color images is extremely important. A multi-color image requires encoding and decoding compression technology (i.e., a reversible compression technology) without loss because the number of colors is limited for a multi-color image.

A technology based on an entropy encoder and decoder has drawn attention in recent years as one type of data compression technique. An example of such is a technology which uses an arithmetic encoding and decoding technology. Synopsis of this technology is described in Japanese Laid-Open Patent Publication 62-185413, Japanese Laid-Open Patent Publication 63-74324 and Japanese Laid-Open Patent Publication 63-76525, the subject matters of which are incorporated herein by reference.

FIGS. 16(A)–(B) show a conventional multi-color encoding system 50 and decoding system 60 which use the above technology. The encoding system 50 includes a line buffer 51 and an entropy encoder 52. Color pixel data 100A is input to the line buffer 51 and the entropy encoder 52. All the color pixel data 100A (shown in FIG. 17) is raster scanned and sequentially input as pixel data in the order of horizontal scanning. A method of attaching an index in the order of the input color is used as a method to form the index data (i.e., the color pixel data 100A) which creates a phenomena such that the colors are substantially different for data with close index such as "1" and "2" or that the colors are quite close for the data with large differences in index such as "100" and "200" as shown in FIG. 22. A method to avoid such phenomena by attaching successive numbers to similar colors is disclosed in Japanese Laid-Open Patent Publication 5-328142, the subject matter of which is incorporated herein by reference.

The line buffer 51 is a reference pixel generation device that generates reference pixel data A, B, C and D for encoding the target pixel X (from the input color pixel data 100A). In other words, the line buffer 51 stores the chronology of n lines (usually 1 to 5 lines) when scanning the image. Moreover, each time the color pixel data 100A is input, the line buffer 51 outputs a series of pixel data to the entropy encoding device 52 consisting of the most recently input pixel A and surrounding pixels B, C and D as reference pixel data 110.

The entropy encoding device 52 uses an arithmetic encoding or Huffman encoding technique. The entropy encoder 52 uses the reference pixel data 110 as status signals, transforms the color pixel data 100A into encoding data 200 and outputs the same.

On the other hand, the decoding system 60 includes a line buffer 61 and an entropy decoder 62. The line buffer 61 and the entropy decoder 62 are created such that the input encoding data 200 is decoded and output through a reverse procedure than that taken by the line buffer 51 and the entropy encoder 52 of the encoding system 50.

The encoding system 50 and the decoding system 60 use completely reversible algorithms to encode the color pixel data 100A into encoding data 200, and to decode the encoding data 200 into the color pixel data 100B. This system is widely used in a variety of applications.

However, when the value or index number of the color pixel data 100A approaches a certain number, the data compression rate improves. The reference pixel data 110 is used as a status signal of the entropy encoder 52 and the entropy decoder 62. Hence, by taking a large number of status numbers (i.e., the reference pixel data) the data compression rate improves. In other words, in structuring the entropy encoder 52 and the entropy decoder 62 using an arithmetic encoding or Huffman encoding technique, the data compression rate may be drastically improved by making large disparity in the occurrence probabilities of the symbols 0 or 1. This is because the entropy encoding technique assigns short encoding data to input data with a high occurrence probability while it assigns relatively long encoding data to input data with a low occurrence probability.

In order to obtain large disparity in the occurrence probability of symbols (i.e., index numbers) a method has been used in which the input data is classified into several statuses and encoded. This is because an improved compression rate is not obtained unless the data is classified. For example, in a conventional technology such as shown in FIGS. 16(A)–(B), reference pixel data is created using the line buffers 51, 61 and is input in the entropy encoder 52 and the entropy decoder 62 as status signals to be used for classification. The entropy encoder 52 and the entropy decoder 62 classify the input data using the status signals and execute encoding and/or decoding. In other words, the entropy encoder 52 and the entropy decoder 62 compute the occurrence probability of each state of the reference pixel data and assign short encoding data to the combination of data with the higher occurrence probability. This improves the data compression rate.

However, a number of encoding parameter tables corresponding to the number of status of the reference pixel data is necessary for the entropy encoder 52 and the entropy decoder 62. The larger the number of reference pixel data, the larger the parameter tables for encoding and decoding. Hence, the entropy encoder 52 and the entropy decoder 62 become large in size and more expensive.

For example, suppose that the color pixel data, namely, the index number includes a 4 bit data (16 types), and the number of pixels of the reference pixel data 110 is four. In this case, the number of status of the encoding and the decoding parameter tables becomes 4 pixels×4 bit=16 status per bit, namely $2^{16}$ numbers of status. Hence, a parameter table for $2^{16}$=65536 entries must be prepared. This shows that an increase in reference pixels results in a large number of encoding and decoding tables which causes the hardware (i.e., the entropy encoder 52 and the entropy decoder) to become large. Moreover, because the target pixel is composed of 4 bits, and because a one bit signal is assigned to each plane, resulting in 16 entries of colors for 4 bits, which in turn requires the parameter table to become a table of 65536×16 as shown in FIG. 18.

Japanese Laid-Open Patent Publication 6-276041, the subject matter of which is incorporated herein by reference, describes a method of color order transformation in which the disparity of occurrence frequency of color symbols for the target pixel is computed and the index number is rearranged corresponding to the occurrence frequency order. The compression rate is further increased by assigning a short encoding data to the index number with a high occurrence frequency. Japanese Laid-Open Patent Publication 6-276041 also discloses a technology in which a parameter table is made smaller in the entropy encoder 52 and the entropy decoder 62 according to the degenerated status number.

FIGS. 19(A)–(B) show the system of degenerating the number of status 15 disclosed in Japanese Laid-Open Patent Publication 6-276041 where the status signal 140 is generated by the status degenerating equipment 53, 63 which degenerates the reference pixel data 110 being output from the line buffer when the reference pixel data 110 is input as the status signal into the entropy encoder 52 and the entropy decoder 62. This input is the same as in the conventional encoding system 50 and decoding system 60.

The status degenerating equipment 53, 63 is composed such that the input reference pixel data 110 is degenerated to the status signal 140 with less bits and is output to the corresponding entropy encoder 52 and entropy decoder 62. A prediction device 54, 64 contains a color order table in its memory for transforming the color pixel data to color order (or reverse of color order) based on the occurrence frequency of each color symbol.

Degeneracy refers to classifying the original status into the number of status after the degeneration. This classification is executed by selecting the combinations such that the entropy (i.e., average information amount to display one symbol) after classification is at a minimum. Moreover, an identification bit is attached to the number of status after degeneration, i.e., after classification. This is the status signal 140.

In one method in which a degeneracy table specifying a relationship between a combined pattern of the color symbol of the reference pixel data 110 and the degeneracy data is established as a degeneracy table to be used in the status degenerating equipment 53, 63. The degeneracy table is used to transform and output the combination pattern of the color symbol of the reference pixel data being input as degenerated data.

FIGS. 20(A)–(B) show an example of a degeneracy operation using such method. For simplicity, an example of a Markov model created by three pixels A, B, C for encoding target pixel X is used as a reference pixel pattern.

If the reference pixel pattern includes three pixels as in FIG. 20 (A), the combination pattern of the color symbol has five possibilities as shown in FIG. 20 (B). In other words, patterns are classified into five patterns, namely a pattern in which all the color symbols of three pixels coincide, three patterns in which only two color symbols coincide and a pattern in which color symbols of all three pixels are different.

Using the FIG. 20(B) table as a degeneracy table of status degenerating equipment 53, 63, the $2^{12}$ patterns which are the number of possible combinations of the original three pixels is degenerated to five status S1–S5 as shown in FIG. 20(B). As a result, the reference pixel data 110 is effectively degenerated and the number of status of the entropy encoder 52 and the entropy decoder 62 is substantially reduced.

A method for such arithmetic encoding and decoding is already disclosed in one pixel encoding standard JBIG (International Standard ISO/IEC 11544), pp. 26–44 and pp. 44–50, the subject matter of which is incorporated herein by reference.

An example of an arithmetic encoding type entropy encoder 52 (FIG. 16) is shown in FIG. 21. The structure of an arithmetic decoding type entropy decoder 62 is substantially the same as the structure of the entropy encoder 52.

The entropy encoder 52 contains an arithmetic algorithm unit 55 and an occurrence probability generation device 56 which functions as a status memory. A status parameter table needed for determining symbol generation probability to be used for encoding is in the occurrence probability generation device 56. The status parameter is specified by the input status symbol. Moreover, the occurrence probability algorithm parameter of the occurrence probability generation device 56 is output to the arithmetic algorithm unit 55 for the table of the status parameter specified by the status symbol. Based on the input occurrence probability, the arithmetic algorithm unit 55 executes entropy encoding and transforms and outputs the color order data 120 as encoding data 200. Moreover, the arithmetic algorithm unit 55 computes the occurrence probability for the status symbol using the value of encoded color order 120, and inputs an algorithm update value to the occurrence probability generation device 56. Storing of the update result as occurrence probability of the next date improves the compression efficiency of the entropy encoder 52.

In order to generate the color order table 120, a color order table is arranged in the prediction devices 54, 64 as described above. FIGS. 23(A)–(C) are an example of an well known color table (see Japanese Laid-Open Patent Publication 6-276041). In determining the color order table for the encoding target pixel X, two-dimensional perimeter data R0, R1, R3, R3 are used as upper color order data, and a one-dimensional table in the same line as the encoding target pixel X is used as lower color order data. First, the color symbols of the perimeter pixel data R0, R1, R2, R3 are deleted from the one-dimensional table, then the upper color order and lower color order are combined to form a color order table of the target pixel X.

The process of forming the color order table is shown in FIGS. 23(A)–(C). A case in which the color symbols are to be encoded will be described. When the color order is fixed by the position of each pixel R0, R1, R2, ... R8 ... as shown in FIG. 23(A) and each color symbol becomes C4, C3, C6, C5, C2, C2 ... as shown in FIG. 23(B), the resulting color table, which is the latest appearance table, becomes the table shown in FIG. 23(C). In other words, the uppermost line becomes C4 for R0, the second order is C3 for R1, the third order is C6 for R2, the fourth order is C5 for R3, the fifth order is C2 for R4, and the sixth order is C2 for R5. However, because C2 already occurs as well as C4 for R6, the sixth order becomes C0 for R7. In this manner, the color order data from which the colors which are already in upper order (i.e., color symbols that appear in R0–R3) is added to the data of R0–R3 and the first to 16th of 16 color symbols are determined. The upper four perimeter pixels may be made variable through learning.

To create the color order table used for transformation of two-dimensional color order shown in FIG. 23, a deleting operation to delete color symbols overlapping in the two-dimensional perimeter data and the one-dimensional table becomes necessary. The process of deleting overlapping color symbols from the one-dimensional table involves vast amounts of processing when the number of bits of the color symbol index code increases. If the total number of color symbols is 16, or equivalently if 4 bits is sufficient for the index code, the process of searching the overlapping color symbols and deleting from the color symbols from the one-dimensional table is not much burden, but if the index code becomes 8 bits then the total number of color symbols becomes 256. Then, the process of searching and deleting overlapping color symbols become enormous.

If the colors of the perimeter pixel data R0, R1, R2 R3 are all different, each color is searched from 256 colors in the one-dimensional table in order to delete whenever the same color symbol is found and to move up the subsequent order with the last color symbol being assigned to the 256th order. To accomplish this, up to 256×4 comparisons may be made.

Moreover, in a color order table comprising only the one-dimensional table (including the color order table shown in FIG. 23) or the one-dimensional table shown in FIG. 45 of Japanese Laid-Open Patent Publication 6-276041, a latest appearance table is created or a move-to-front process is executed using a FIFO having a plurality of registers. The amount of processing for creating the latest appearance table increases due to an increase in the amount of algorithm caused by an increase in number of bits in the index code. In dealing with the index codes with large numbers of bits, the process speed declines during multi-color image encoding or decoding.

Moreover, in drastically reducing the status numbers to execute coding and decoding using Markov model reference pixel such as shown in FIG. 20, the context of Markov model input to the entropy encoder 52 and the entropy decoder 62 cannot be verified until the pixels described by A is established in the reference pixels which is one pixel before the encoding target pixel X in FIG. 20 (A). Hence, encoding and decoding must be delayed until the context is confirmed which restricts high speed operation.

SUMMARY OF THE INVENTION

The present invention resolves these problems and provides a multi-color image encoding and/or decoding apparatus and its method, which are capable of substantially improving process speed in executing two-dimensional color order transformation. The present invention provides a multi-color image encoding apparatus capable of substantially improving process speed by drastically reducing a sorting algorithm in executing move-to-front process, namely the latest appearance table creation process. Furthermore, the present invention provides a multi-color image encoding apparatus enabling high speed operation without reducing the compression rate or decoding efficiency in employing a Markov model during encoding and decoding.

A multi-color image encoding apparatus may have a prediction device for reading a color order table in which the color order of each color symbol is established for reading and outputting the color order of the color symbol corresponding to target color pixel data to which an index code consisting of a plurality of bits is attached from the color order table. A perimeter pixel generation device outputs two-dimensional perimeter pixel data for the target color pixel data based on the color pixel data being input. An entropy encoding device transforms and outputs the color order data into encoding data. The color order table may be created by combining a two-dimensional color order table which establishes a color order for color symbols of each pixel of the two-dimensional perimeter pixel data, and a one-dimensional color order table for lower color orders that establishes a predetermined number of color orders for the color symbols corresponding to the color pixel data which is input ahead of the target color pixel data. The combined color order table is generated by creating a latest appearance table that moves the color order of the color symbols corresponding to the color pixel data most recently input to the uppermost line. An escape symbol generation device outputs escape symbols for the orders corresponding to the color symbols below the order of the predetermined number when the total number of color symbols in the upper color order and in the lower color order exceeds the predetermined number.

By using escape symbols for color symbols with orders higher than the predetermined number, the total number of color symbols needs not be restricted to the number defined by the bit number of the index code. Hence, deletion of overlapping color symbols is not needed and the order may be clearly indicated to be the specific order by combining with other means. As a result, the process speed during encoding may be drastically improved.

A multi-color image encoding apparatus may include a prediction device for recording a color order table in which the color order of each color symbol is established and for outputting the color order of the color symbol corresponding to target color pixel data to which an index code consisting of a plurality of bits is attached from the color order table. A perimeter pixel generation device may output two-dimensional perimeter pixel data for the target color pixel data based on the color pixel data being input. An entropy decoding device may transform and output the color order data into encoding data. The color order table may be created by combining a two-dimensional color order table which establishes color order for color symbols of each pixel composing the two-dimensional perimeter pixel data and a one-dimensional color order table for lower color orders which establishes predetermined number of color orders for the color symbols corresponding to the color pixel data which is input ahead of the target color pixel data and which is generated by creating a latest appearance table that moves the color order of the color symbols corresponding to the color pixel data most recently input to the uppermost line. When color symbols in the two-dimensional color order table overlap color symbols in the one-dimensional color order table, the overlapped color symbols are not deleted from the one-dimensional color table.

A color order table may be created without deleting the color symbol even when the color symbols are overlapping; hence, sorting requiring deletion becomes unnecessary. As a result, a drastic reduction in the algorithm is enabled and the encoding process speed improves substantially.

The uppermost line of the two-dimensional color order table and the uppermost line of the one-dimensional color order may be made to be color symbols of the image being input immediately before the target color pixel data. The resulting color symbols may be placed in the uppermost line of the combined table. In this manner, the pixel which is immediately before and which has the highest correlation to the target color pixel is moved to the uppermost line which becomes the first order. This improves the encoding efficiency.

If the bit number is denoted by x, then the number of color symbols in the one-dimensional color order table becomes $2^x$, and the $(2^x+n)$th (n: integer) symbol from the top, and if the number of orders of the combined color order table is allowed to exceed $2^x$, is represented by the escape symbol in x bits and x-bit symbols denoting "n".

Thus, the escape symbol and the symbol to indicate the number following the escape symbol are the same as the bit number of the index code (i.e., the bit number to indicate the order of the color symbol). Hence, the bit number process may be executed as before thus preventing the hardware from becoming large in size and expensive.

A multi-color image decoding apparatus may include a degeneracy device for classifying and degenerating conditions of pixels surrounding the target color pixel data into a plurality of reference pixel patterns. The reference pixels for degenerating may be made different from the perimeter pixels for the two-dimensional color order table. Hence, the pipeline process between the processing unit which executes two-dimensional color order transformation and the entropy encoder which executes processing using a Markov model becomes possible, which enables high speed operation.

A multi-color image encoding apparatus may include a prediction device for reading a color order table in which the color order of each color symbol is established and outputting the color order of the color symbol corresponding to target color pixel data to which an index code consisting of a plurality of bits is attached from the color order table. A perimeter pixel generation device may output two-dimensional perimeter pixel data for the target color pixel data based on the color pixel data being input. An entropy encoding device may transform and output the color order data into encoding data. The color order table may be created by combining a two-dimensional color order table which establishes color order for color symbols of each pixel composing the two-dimensional perimeter pixel data and a one-dimensional color order table for lower color order which establishes a predetermined number of color orders for the color symbols corresponding to the color pixel data which is input ahead of the target color pixel data. The combined color order table may be generated by creating a latest appearance table that moves the color order of the color symbols corresponding to the color pixel data most recently input to the uppermost line. A degeneracy device may classify and degenerate conditions of pixels surrounding the target color pixel data into a plurality of reference pixel patterns. The reference pixels for degenerating are made different from the perimeter pixels for the two-dimensional color order table.

Hence, the pipeline process between the processing unit which executes two-dimensional color order transformation and the entropy encoder which executes process using a Markov model becomes possible, which enables high speed encoding operation.

A multi-color image encoding method may include a prediction step for recording a color order table in which the color order of each color symbol is established for reading and outputting the color order of the color symbol corresponding to target color pixel data to which an index code consisting of a plurality of bits is attached from the color order table. A perimeter pixel generation step may output two-dimensional perimeter pixel data for the target color pixel data based on the color pixel data being input. An entropy encoding step may transform and output the color order data into encoding data. The color order table may be created by combining a two-dimensional color order table which establishes color order for color symbols of each pixel of the two-dimensional perimeter pixel data and a one-dimensional color order table for lower color orders which establishes a predetermined number of color orders for the color symbols corresponding to the color pixel data which is input ahead of the target color pixel data. The combined color order table is generated by creating a latest appearance table that moves the color order of the color symbols corresponding to the color pixel data most recently input to an uppermost line. An escape symbol generation step outputs escape symbols for the orders corresponding to the color symbols below the order of a predetermined number when the total number of color symbols in the upper color order and in the lower color order exceeds the predetermined number.

By using escape symbol for color symbols with orders higher than the predetermined number, the total number of color symbols needs not be restricted to the number defined by the bit number of the index code describing the color symbols. Hence, deletion of overlapping color symbols is not needed and the order may be clearly indicated to be the specific order by combining with other means. As a result, the process speed during encoding may be drastically improved.

A multi-color image encoding method may be provided including a prediction step for reading a color order table in which the color order of each color symbol is established and outputting the color order of the color symbol corresponding to target color pixel data to which an index code consisting of a plurality of bits is attached from the color order table. A perimeter pixel generation step may output two-dimensional perimeter pixel data for the target color pixel data based on the color pixel data being input. An entropy encoding step may transform and output the color order data into encoding data. The color order table may be created by combining a two-dimensional color order table which establishes color order for color symbols of each pixel of the two-dimensional perimeter pixel data and a one-dimensional color order table for lower color order which establishes a predetermined number of color orders for the color symbols corresponding to the color pixel data which is input ahead of the target color pixel data. The combined color order table is generated by creating a latest appearance table that moves the color order of the color symbols corresponding to the color pixel data most recently input to an uppermost line. When color symbols in the two-dimensional dolor order table overlap color symbols in the one-dimensional color order table, the overlapped color symbols are not deleted from the one-dimensional color table.

A color order table may be created without deleting the color symbol even when the color symbols are overlapping making deletion unnecessary. As a result, a drastic reduction in the algorithm is enabled and the encoding process speed improves substantially.

The uppermost line of the two-dimensional color order table and the uppermost line of the one-dimensional color order may be made to be color symbols of the image being input immediately before the target color pixel data. The resulting color symbols may be placed in the uppermost line of the combined table. In this manner, the pixel which is immediately before and which is the to have the highest correlation to the target color pixel is moved to the uppermost line which becomes the first order thereby improving the encoding efficiency.

If the bit number is denoted by x, then the number of color symbols in the one-dimensional color order table becomes $2^x$, and the ($2^x$+n)th (n: integer) symbol from the top, assuming that the number of orders of the combined color order table is allowed to exceed $2^x$, is represented by the escape symbol in x bits and x-bit symbols denoting "n".

The escape symbol and the symbol to indicate the number following the escape symbol are made the same as the bit number of the index code (i.e., the bit number to indicate the order of the color symbol).

A degeneracy step may classify and degenerate conditions of pixels surrounding the target color pixel data into a plurality of reference pixel patterns. The reference pixels for degenerating are different from the perimeter pixels for the two-dimensional color order table. Hence, a pipeline process becomes possible between the processing unit which executes two-dimensional color order transformation and the entropy encoder which executes process using a Markov model, which enables a high speed encoding operation.

A prediction step may be provided for reading a color order table in which the color order of each color symbol is established and outputting the color order of the color symbol corresponding to the target color pixel data to which an index code consisting of a plurality of bits is attached from the color order table. A perimeter pixel generation step may output two-dimensional perimeter pixel data for the target color pixel data based on the color pixel data being input. An entropy encoding step may transform and output the color order data into encoding data. The color order table may be created by combining a two-dimensional color order table which establishes color order for color symbols of each pixel of the two-dimensional perimeter pixel data and a one-dimensional color order table for lower color order which establishes predetermined number of color orders for the color symbols corresponding to the color pixel data which is input ahead of the target color pixel data. The combined color order table may be generated by creating a latest appearance table that moves the color order of the color symbols corresponding to the color pixel data most recently input to the uppermost line. A degeneracy step may classify and degenerate conditions of pixels surrounding the target color pixel data into a plurality of reference pixel patterns. Reference pixels for degenerating may be made different from the perimeter pixels for the two-dimensional color order table.

Hence, the pipeline process between the processing unit which executes two-dimensional color order transformation and the entropy encoder which executes a process using a Markov model becomes possible, which enables high speed encoding operation.

A multi-color image decoding apparatus may include entropy decoding means for transforming and outputting the target encoding data being input to the color order data. A prediction device may be provided for reading a color order table in which the color order of each color symbol is established and outputting from the color order table color symbols corresponding to the color order data being input as the target color pixel data composed of a plurality of bits. A perimeter pixel generation device may output two-dimensional perimeter pixel data for the target color pixel data based on the color pixel data being decoded. The color order table may be a table created by combining a two-dimensional color order table which establishes color order for color symbols of each pixel of the two-dimensional perimeter pixel data and a one-dimensional color order table for lower color order which establishes a predetermined number of color orders for the color symbols corresponding to the color pixel data which is output ahead of the target color pixel data. The combined color order table is generated by creating a latest appearance table that moves the color order of color symbols specified by the color order most recently input to the uppermost line. The target encoding data may be decoded and output as color pixel data using the color order data corresponding to the target encoding data. A determination device may output index codes of the color symbols as color pixel data whose order are below a predetermined number in the combined color order table when escape symbols indicating that the order corresponding to color symbols are below the predetermined number for orders.

By using escape symbols for color symbols with orders higher than predetermined number, the total number of color symbols needs not be restricted to the number defined by the bit number of the index code describing the color symbols. Hence, deletion of overlapping color symbols is not needed and the order may be clearly indicated to be the specific order by combining with other means. As a result, the decoding process speed may be drastically improved.

A multi-color image decoding apparatus may include an entropy decoding device for transforming and outputting the target encoding data being input as color order data. A prediction device may read a color order table in which the color order of each color symbol is established and output color symbols corresponding to the color order data being input as the target color pixel data composed of a plurality of bits. A perimeter pixel generation device may output two-dimensional perimeter pixel data for the target color pixel data based on the color pixel data being decoded. The color order table may be created by combining a two-dimensional color order table which establishes color order for color symbols of each pixel of the two-dimensional perimeter pixel data and a one-dimensional color order table for lower color order which establishes predetermined number of color orders for the color symbols corresponding to the color pixel data which is output ahead of the target color pixel data. The combined color order table may be generated by creating a latest appearance table that moves the color order of color symbols specified by the color order most recently input to an uppermost line. The target encoding data may be decoded and output as color pixel data using the color order data corresponding to the target encoding data. When color symbols in the two-dimensional color order table overlap color symbols in the one-dimensional color order table, the overlapped color symbols may not be deleted from the one-dimensional color table.

A color order table may be created without deleting the color symbol even when the color symbols are overlapping making deletion unnecessary. As a result, a drastic reduction in the algorithm is enabled and decoding process speed improves substantially.

A multi-color image decoding apparatus may include an entropy decoding device that transforms and outputs the target encoding data being input as color order data. A prediction device may be provided for reading a color order table in which the color order of each color symbol is established and outputting color symbols corresponding to the color order data being input as the target color pixel data composed of a plurality of bits. A perimeter pixel generation device may output two-dimensional perimeter pixel data for the target color pixel data based on the color pixel data being decoded. The color order table may be a table created by combining a two-dimensional color order table which establishes color order for color symbols of each pixel composing the two-dimensional perimeter pixel data and a one-dimensional color order table for lower color order which establishes a predetermined number of color orders for the color symbols corresponding to the color pixel data which is output ahead of the target color pixel data. The combined color order table may be generated by creating a latest appearance table that moves the color order of color symbols specified by the color order most recently input to the uppermost line. The target encoding data may be decoded and output as color pixel data using the color order data corresponding to the target encoding data. A degeneracy device may classify and degenerate conditions of pixels surrounding the target color pixel data into a plurality of reference pixel patterns. The reference pixels for degenerating may be made different from the perimeter pixels for the two-dimensional color order table.

Hence, the pipeline process between the processing unit which executes two-dimensional color order transformation and the entropy encoder which executes process using a Markov model becomes possible, which enables high speed decoding operation.

A multi-color image decoding method may include entropy decoding step for transforming and outputting the target encoding data being input to the color order data. A prediction step may be provided for reading a color order table in which the color order of each color symbol is established and outputting color symbols corresponding to the color order data being input as the target color pixel data composed of a plurality of bits. A perimeter pixel generation step may output two-dimensional perimeter pixel data for the target color pixel data based on the color pixel data being decoded. The color order table may be created by combining a two-dimensional color order table which establishes color order for color symbols of each pixel of the two-dimensional perimeter pixel data, and a one-dimensional color order table for lower color order which establishes predetermined number of color orders for the color symbols corresponding to the color pixel data which is output ahead of the target color pixel data. The combined color order table may be generated by creating a latest appearance table that moves the color order of color symbols specified by the color order most recently input to the uppermost line. The target encoding data may be decoded and output as color pixel data using the color order data corresponding to the target encoding data. A determination step may output index codes of the color symbols as color pixel data whose order are below a predetermined number in the combined color order table as color pixel data when escape symbols indicating that the order corresponding to color symbols is below the predetermined number for orders corresponding to color symbols whose orders are below the predetermined number.

By using escape symbols for color symbols with orders higher than the predetermined number, the total number of color symbols is not restricted to the number defined by the bit number of the index code describing the color symbols. Hence, deletion of overlapping color symbols is not needed and the order may be clearly indicated to be the specific order by combining with other means. As a result, the decoding process speed may be drastically improved.

A multi-color image decoding method may include an entropy decoding step for transforming and outputting the target encoding data being input as color order data. A prediction step may be provided for recording a color order table in which the color order of each color symbol is established and outputting color symbols corresponding to the color order data being input as the target color pixel data composed of a plurality of bits. A perimeter pixel generation step may output two-dimensional perimeter pixel data for the target color pixel data based on the color pixel data being decoded. The color order table may be created by combining a two-dimensional color order table which establishes color order for color symbols of each pixel composing the two-dimensional perimeter pixel data, and a one-dimensional color order table for lower color order which establishes predetermined number of color orders for the color symbols corresponding to the color pixel data which is output ahead of the target color pixel data. The combined color order table may be generated my creating a latest appearance table that moves the color order of color symbols specified by the color order most recently input to the uppermost line. The target encoding data is decoded and output as color pixel data using the color order data corresponding to the target encoding data. When color symbols in the two-dimensional color order table overlap color symbols in the one-dimensional color order table, the overlapped color symbols are not deleted from the one-dimensional color table.

A color order table may be created without deleting the color symbol even when the color symbols are overlapping, making deletion unnecessary. As a result, a drastic reduction of the algorithm amount is enabled and the decoding process speed improves substantially.

A multi-color image decoding method may include an entropy decoding step for transforming and outputting the target encoding data being input as color order data. A prediction step may be provided for using a color order table in which the color order of each color symbol is established for reading and outputting color symbols corresponding to the color order data being input as the target color pixel data composed of a plurality of bits. A perimeter pixel generation step may output two-dimensional perimeter pixel data for the target color pixel data based on the color pixel data being decoded. The color order table is created by combining a two-dimensional color order table which establishes color order for color symbols of each pixel composing the two-dimensional perimeter pixel data, and a one-dimensional color order table for lower color order which establishes predetermined number of color orders for the color symbols corresponding to the color pixel data which is output ahead of the target color pixel data. The combined color order table may be generated by creating a latest appearance table that moves the color order of color symbols specified by the color order most recently input to the uppermost line. The target encoding data may be decoded and output as color pixel data using the color order data corresponding to the target encoding data. A degeneracy step may classify and degenerate conditions of pixels surrounding the target color pixel data into a plurality of reference pixel patterns. The reference pixels for degenerating are different from the perimeter pixels for the two-dimensional color order table.

Hence, the pipeline process between the processing unit which executes two-dimensional color order transformation and the entropy decoder which executes process using a Markov model becomes possible thereby enabling high speed decoding operation.

A multi-color image encoding apparatus may include a prediction device having a color order table in which the color order of each color symbol is established for reading and outputting the color order of the color symbol corresponding to target color pixel data to which an index code consisting of a plurality of bits is attached from the color order table. An entropy encoding device may transform and output the color order date as encoding data. The prediction device may be created to execute, with each input of the color pixel data, a latest appearance table to move the color order of color symbols corresponding to input color pixel data in the color order table to the uppermost line. The target color pixel data may be encoded and output as encoding data corresponding to the target color pixel data using the color order data. The upper orders in the color order table may be included in a FIFO unit which executes a process to sequentially decrease the original orders below the uppermost line. The lower orders in the color order table may be included in a replacement unit which executes a process to carry over the color symbols removed from the FIFO unit to an empty location by returning to the uppermost line. The table may be created by the FIFO unit and the replacement unit.

Only the upper orders of the color order table may be included in a FIFO unit which executes normal move-to-front process while the lower orders are included in a switching unit which executes switching process. Hence, the process speed during encoding is improved without decreasing the compression rate.

The FIFO unit may be made of a plurality of registers and the replacement unit may be made of RAM. Because RAM is used, updating of the RAM unit is simplified and the encoding process speed is drastically improved.

A degeneracy device may be provided for degenerating reference pixel data being input and for outputting the degenerated data. A transformation table may be provided for each condition parameter corresponding to degeneracy data created by the degeneracy device. The target color pixel data being input may be transformed and output as the target encoding data using the transformation table. The pixel data most recently input out of all the pixel data that are input prior to the target color pixel data is not used as the reference pixel data.

The pixel data most recently input out of all the pixel data that are input prior to the target color pixel data may not be used as the Markov model reference pixel data. Thus, it is possible to make encoding process and other process such as a process of two-dimensional color order transformation using the latest pixel data a pipeline process, which enables a high speed encoding operation, although the compression rate slightly declines.

A prediction device may be provided with a color order table in which the color order of each color symbol is established for reading and outputting the color order of the color symbol corresponding to target color pixel data. An entropy encoding device may transform and output the color order data into encoding data. The transformation table is provided in the entropy encoding device and the pixel data most recently input is used for creation of the color order table.

Because the pixels which are the most recently input for the target color pixel may be used to create the color order table, the pipeline process between the color order transformation unit and the entropy encoding device becomes possible, which enables a high speed encoding operation.

A multi-color image encoding method may include a prediction step with a color order table in which the color order of each color symbol is established for reading and outputting the color order of the color symbol corresponding to target color pixel data to which an index code consisting of a plurality of bits is attached from the color order table. An entropy encoding step may be provided for transforming and outputting the color order data as encoding data. The prediction step may be created to execute, with each input of the color pixel data, a latest appearance table to move the color order of color symbols corresponding to input color pixel data in the color order table to the uppermost line. The target color pixel data may be encoded and output as encoding data corresponding to the target color pixel data using the color order data. The upper orders in the color order table may be included in a FIFO unit which executes a process to sequentially decrease the original orders below the uppermost line while the lower orders in the color order table may be included in a replacement unit which executes a process to carry over the color symbols removed from the FIFO unit to an empty location by returning to the uppermost line. The table may be created by the FIFO unit and the replacement unit.

In this manner, only the upper order of the color order table may be included in the FIFO unit which executes normal move-to-front process while the lower order is included in a switching unit which executes switching process. This improves the encoding speed without decreasing the compression rate.

The FIFO unit may be made of a plurality of registers and the replacement unit may be made of RAM. Because RAM is used, updating of the RAM unit is simplified, the process speed during encoding is drastically improved and hardware is made small.

Furthermore, a degeneracy step may be provided for degenerating the reference pixel data being input and for outputting the degenerated data. A transformation table may be provided for each condition parameter corresponding to degeneracy data created by the degeneracy step. The target color pixel data being input may be transformed and output as the target encoding data using the transformation table. The pixel data most recently input out of all the pixel data that are input prior to the target color pixel data may not be used as the reference pixel data.

In this manner, the pixel data most recently input out of all the pixel data that are input prior to the target color pixel data may not be used as the Markov model reference pixel data. Thus, it is possible to make the encoding process and other processes such as a process of two-dimensional color order transformation using the latest pixel data a pipeline process, which enables a high speed encoding operation, although the compression rate declines slightly.

A prediction step may be provided with a color order table in which the color order of each color symbol is established for reading and outputting the color order of the color symbol corresponding to target color pixel data. An entropy encoding step may be provided for transforming and outputting the color order data into encoding data. The transformation table may be provided in the entropy encoding step and the pixel data most recently input is used to create the color order table.

Because the pixels which are the most recently input for the target color pixel are used to create the color order table, the pipeline process between color order transformation step and the entropy encoding step becomes possible, which enables a high speed encoding operation.

A multi-color image decoding apparatus may include an entropy decoding device for transforming and outputting the target encoding data being input to the color order data. A prediction device may be provided with a color order table in which the color order of each color symbol is established for reading and outputting from the color order table color symbols corresponding to the color order data being input as the target color pixel data composed of a plurality of bits. The prediction device may be created to execute, with each input and decoding of the color order data, a latest appearance table to move the color order of color symbols corresponding to decoding color pixel data in the color order table to the uppermost line. The target color pixel data may be encoded and output as color pixel data using the color order data corresponding to the target encoding data. The upper orders in the color order table may be included in a FIFO unit which executes a process to sequentially decrease the original orders below the uppermost line while the lower orders in the color order table may be included in a replacement unit which executes a process to carry over the color symbols removed from the FIFO unit to an empty location by returning to the uppermost line. The table may be created by the FIFO unit and the replacement unit.

Only the upper order of the color order table may be included in a FIFO unit which executes normal move-to-front process while the lower orders are included in a switching unit which executes a switching process. This improves the decoding speed without decreasing the decoding efficiency greatly.

The FIFO unit may be made of a plurality of registers and the replacement unit may be made of RAM.

Because RAM is used, updating of the RAM unit is simplified and the process speed during decoding is drastically improved.

A multi-color image decoding apparatus may include a degeneracy device for degenerating the reference pixel data being input and for outputting the degenerated data. A transformation table may be provided for each condition parameter corresponding to degeneracy data created by the degeneracy device. The target color pixel data being input may be transformed and output as the target encoding data using the transformation table. The pixel data most recently input out of all the pixel data that are input prior to the target color pixel data may not be used as the reference pixel data.

The pixel data most recently input out of all the pixel data that are input prior to the target encoding data may not be used as the Markov model reference pixel data. Hence, it is possible to make the decoding process and other processes such as a process of two-dimensional color order transformation using the latest pixel data a pipeline process, which enables a high speed decoding operation, although the decoding efficiency declines slightly.

A prediction device may be provided with a color order table in which the color order of each color symbol is established for reading and outputting the index code of the color symbols corresponding to the target encoding data. An entropy decoding device may be provided for transforming and outputting the target encoding data as color order data. The transformation table may be provided in the entropy decoding device. The pixel data most recently input may be used to create the color order table.

Because the pixels which are the most recently input for the target encoding data are used to create the color order table, a pipeline process between the color order transformation unit and the entropy decoding device becomes possible, which enables a high speed decoding operation.

A multi-color image decoding method may include an entropy decoding step for transforming and outputting the target encoding data being input to the color order data. A prediction step may be provided with a color order table in which the color order of each color symbol is established for reading and outputting from the color order table color symbols corresponding to the color order data being input as the target color pixel data composed of a plurality of bits. The prediction step may be created to execute with each input and decoding of the color order data, a latest appearance table to move the color order of color symbols corresponding to decoding color pixel data in the color order table to the uppermost line. The target color pixel data may be encoded and output as color pixel data using the color order data corresponding to the target encoding data. The upper orders in the color order table may be included in a FIFO unit which executes a process to sequentially decrease the original orders below the uppermost line while the lower orders in the color order table may be included in a replacement unit which executes a process to carry over the color symbols removed from the FIFO unit to an empty location by returning to the uppermost line. The table may be formed in the FIFO unit and the replacement unit.

Only the upper order of the color order table is included in a FIFO unit which executes normal move-to-front process while the lower order is included in a switching unit which executes switching process to improve the speed during decoding without decreasing the decoding efficiency.

The FIFO unit may be made of a plurality of registers and the replacement unit may be made of RAM. Because RAM is used, updating of the RAM unit is much simplified, the process speed during decoding is drastically improved and hardware is made small.

Furthermore, a multi-color image decoding method may be provided including a degeneracy step for degenerating the reference pixel data being input and for outputting the degenerated data. A transformation table may be provided for each condition parameter corresponding to degeneracy data created by the degeneracy step. The target encoding data being input may be transformed and output as the target color pixel data using the transformation table. The pixel data most recently input out of all the pixel data that are input prior to the target encoding data may not be used as the reference pixel data.

The pixel data most recently input out of all the pixel data that are input prior to the target encoding data may not be used as the Markov model reference pixel data. Hence, it is possible to make the decoding process and other processes such as a process of two-dimensional color order transformation using the latest pixel data a pipeline process, which enables a high speed decoding operation, although the decoding efficiency declines slightly.

A prediction step may be provided with a color order table in which the color order of each color symbol is established for reading and outputting the index code of the color symbols corresponding to the target encoding data. An entropy decoding step may be provided for transforming and outputting the target encoding data as color order data. The transformation table may be provided in the entropy decoding step and the pixel data most recently input may be used for creation of the color order table.

Because the pixels which are the most recently input for the target encoding data are used to create the color order table, the pipeline process between the step of color order transformation unit and the entropy decoding step becomes possible, which enables a high speed decoding operation.

Other objects, advantages and salient features of the invention will become apparent from the following detailed description taken in conjunction with the annexed drawings, which disclose preferred embodiments of the invention.

BRIEF DESCRIPTION OF THE DRAWINGS

The invention will be described with reference to the following drawings in which like reference numerals refer to like elements and wherein:

FIG. 6 shows the two-dimensional color order table employed in the encoding system and decoding system;

FIG. 7 shows the one-dimensional color order table employed in the encoding system and decoding system;

FIG. 8 shows the combined color order table employed in the encoding system and decoding system;

FIG. 12(B) shows encoding when the encoding target pixel has arrived at the end of the second line, and FIG. 12(C) shows encoding when the encoding target pixel has arrived at the first part of the neighboring strip;

FIGS. 23(A)–(C) show the conventional combined color order table creation principle with FIG. 23(A) showing the relationship of each pixel, FIG. 23(B) showing the color symbol of each pixel and FIG. 23(C) showing the combined color order table (latest appearance table).

DETAILED DESCRIPTION OF PREFERRED EMBODIMENTS

Figure 1:
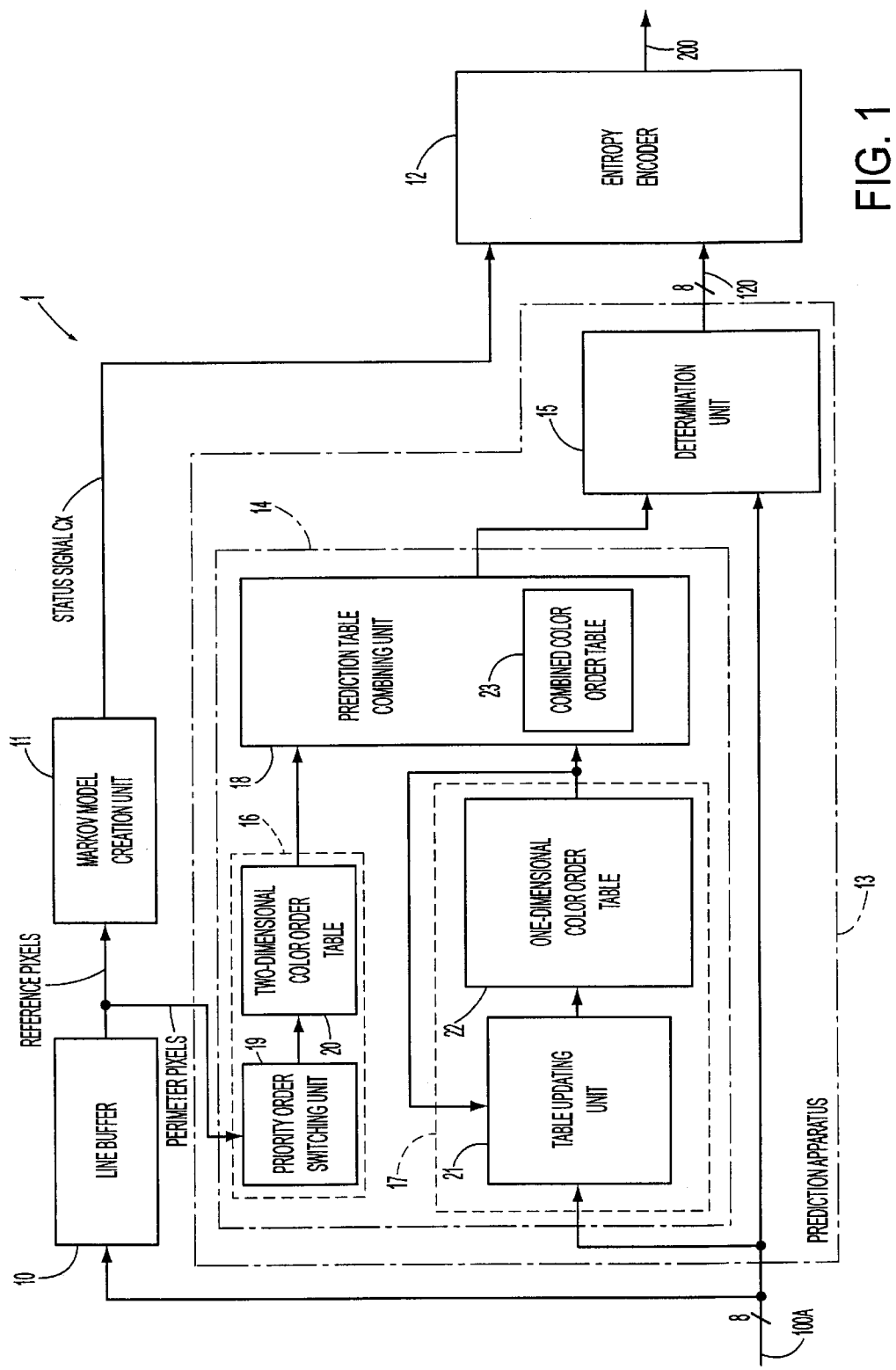
FIG. 1 shows an encoding system utilizing the multi-color image encoding apparatus and method according to the present invention.
Figure 2:
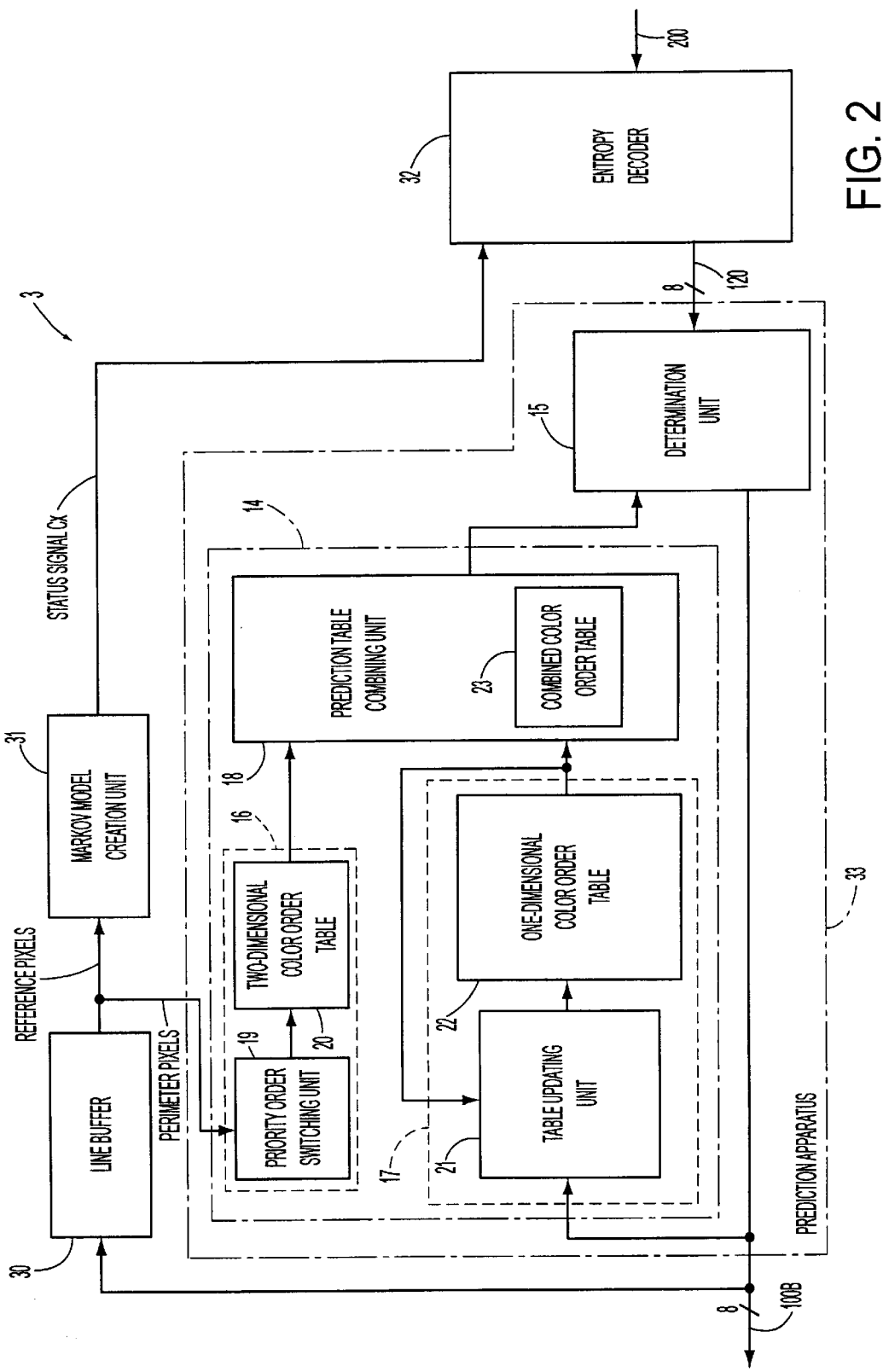
FIG. 2 shows a decoding system utilizing the multi-color image decoding apparatus and method according to the present invention.

FIG. 1 shows a preferred embodiment of the multi-color image encoding system 1 according to the present invention. FIG. 2 shows a preferred embodiment for the multi-color image decoding system 3 corresponding to the encoding system 1 of FIG. 1.

The encoding system 1 includes a line buffer 10 (including a perimeter pixel generation device and a reference pixel generation device), a Markov model creation unit 11 (including a degeneracy device), an entropy encoder 12 and a prediction apparatus 13. The encoding system 1 is structured to transform a data stream of input color pixel data 100A into a data stream of encoding data 200 and to output the encoding data.

The prediction apparatus 13 includes a color order generation unit 14 and a determination unit 15 that functions as an escape symbol generation device. The color order generation unit 14 may include a two-dimensional color order generation unit 16 for determining the upper color order, a one-dimensional color order generation unit 17 for determining the lower color order, and a prediction table combining unit 18 for generating a color order table 23 by combining outputs from the two generation units 16 and 17. The two-dimensional color order generation unit 16 may include a priority order switching unit 19 and a two-dimensional color order table 20. The one-dimensional color order generation unit 17 may include a table updating unit 21 and a one-dimensional color order table 22.

The color pixel data 100A which is the target of encoding is multi-color pixels and includes data with an 8 bit index code per pixel so that color symbols for 256 colors can be displayed. The color pixel data 100A is supplied to the line buffer 10 and the table updating unit 21.

Figure 3:
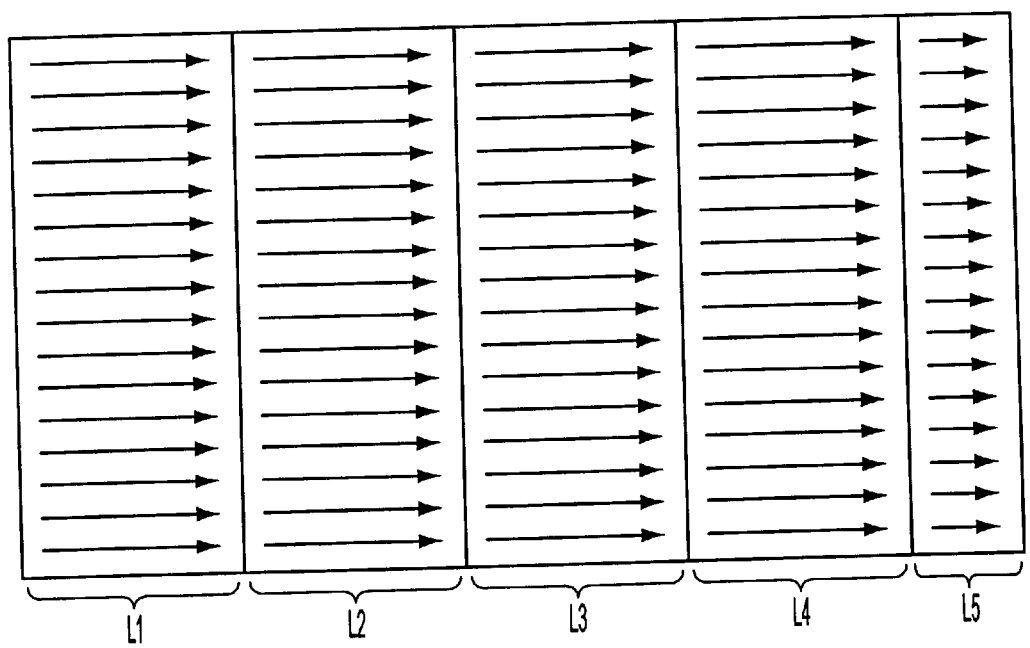
FIG. 3 shows a scanning method employed in the encoding system and decoding system of FIGS. 1 and 2.

The line buffer 10 stores the targeted image as pixel data into strips of a limited number of pixels such as shown in FIG. 3. This apparatus reads the entire image shown in FIG. 3 into memory, and then stores at least the most recently input seventeen pixels from the strips L1–L5 partitioned into horizontal widths of 16 pixels. Those values are input into the two-dimensional color order generation unit 16 as the perimeter pixels and the two-dimensional color order table 20 is created. The values are also input into the Markov model generation unit 11 as reference pixels and a status signal Cx is generated.

The Markov model generation unit 11 receives the four perimeter pixels (A, B, C and D) excluding the immediately prior pixel (indicated as "-") as reference pixels for the target pixel X as shown in FIG. 4 and a status signal Cx is generated. The immediately prior pixel is not used; instead, the pixel one prior to that pixel is used as follows. When the immediately prior pixel is used as a reference pixel, the status signal Cx input into the entropy encoder 12 and the entropy decoding apparatus 32 is not settled until the color symbol of that pixel is settled. Thus, it is impossible to speed up encoding and decoding. The second prior pixel A is used as the reference pixel due to the demand for higher speeds.

Figure 21:
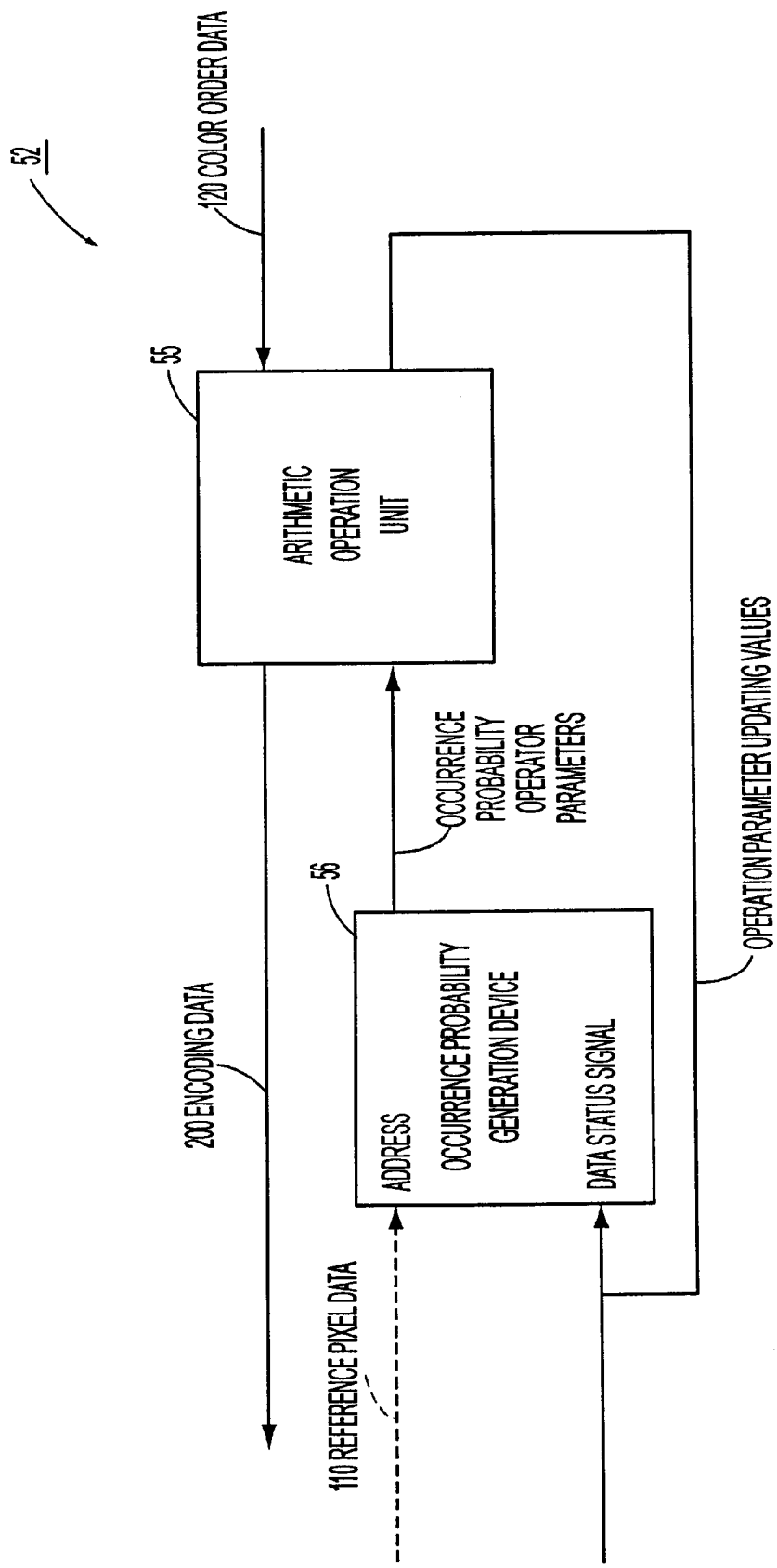
FIG. 21 shows a conventional arithmetic symbol-type entropy encoding device and an entropy decoding device.
Figure 22:
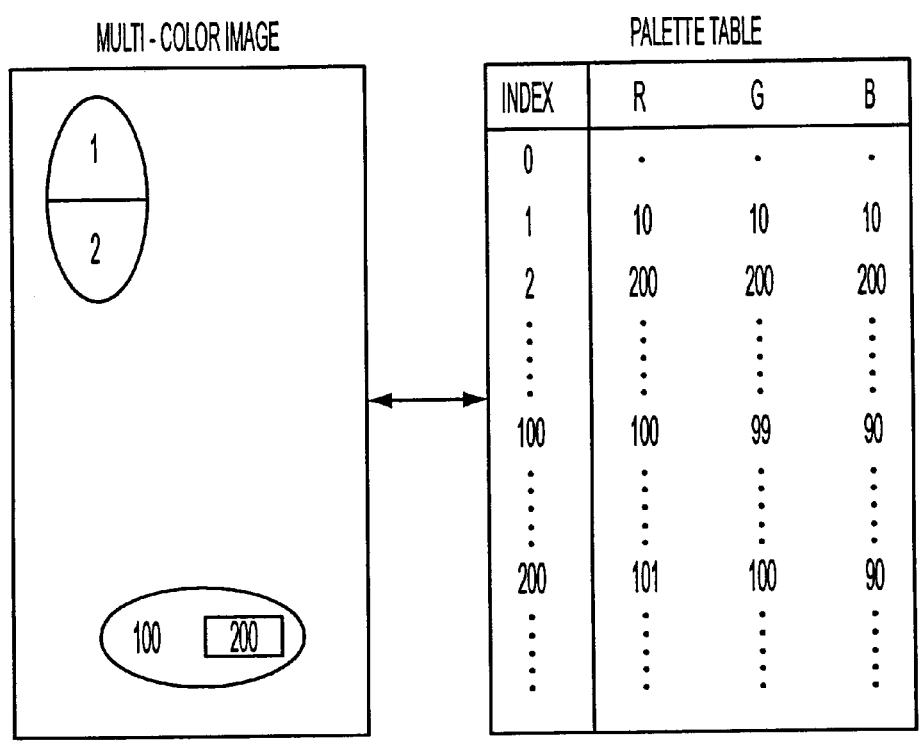
FIG. 22 shows a conventional index for a multi-color image.
Figure 23A:
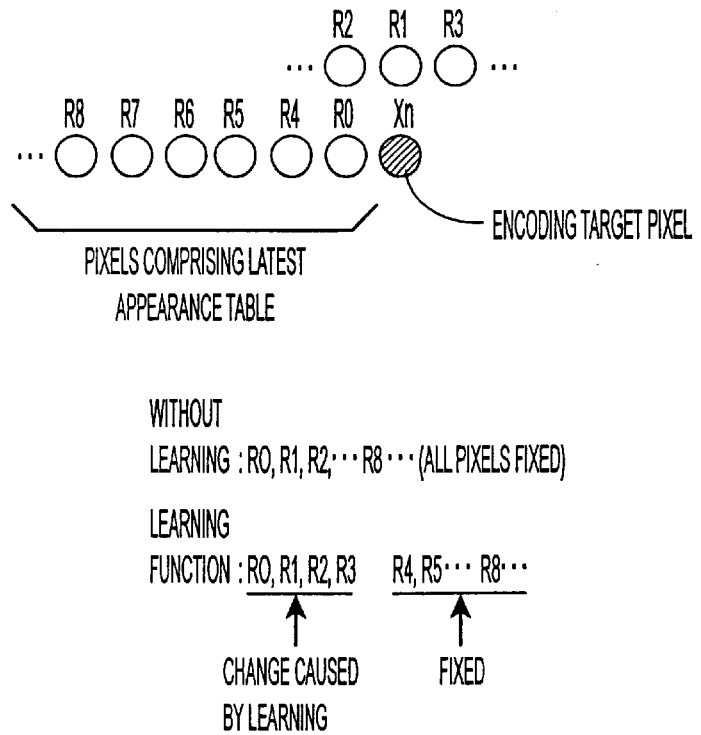
Figure 23B:
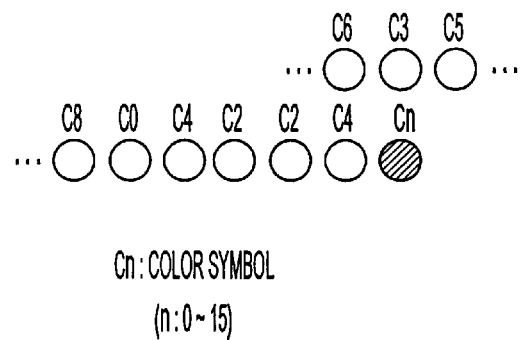

The entropy encoder 12 is the arithmetic entropy encoder shown in FIG. 21, which has a transformation table (not shown) for each status parameter.

The prediction apparatus 13 functions as a prediction device. The color pixel data 100A is input into the color order generation unit 14 and the determination unit 15 in the prediction apparatus 13. In addition, the perimeter pixel data from the line buffer 10 is input to the color order generation unit 14.

Figures 4A, 4B:
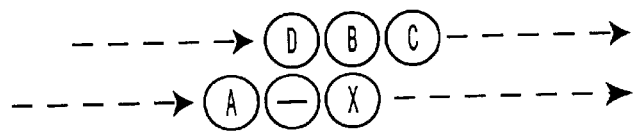
FIGS. 4(A)–(B) show the Markov model and context employed in the encoding system and decoding system with FIG. 4(A) showing the arrangement of reference pixels used as the Markov model and FIG. 4(B) showing the types of contexts (i.e., status signals) in the Markov model.
Figure 5A:
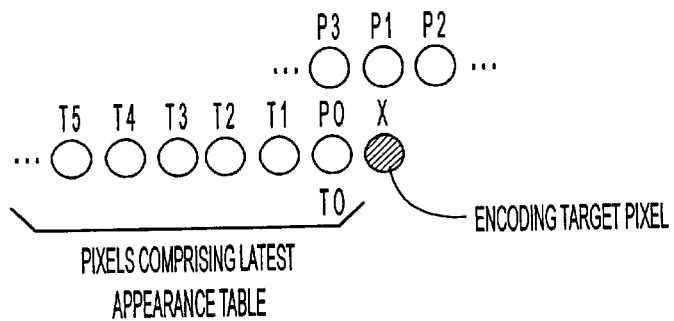
FIGS. 5(A)–(B) show the pixels used in creating the color order tables with FIG. 5(A) showing the arrangement of pixels used and the pixel priority order and FIG. 5(B) showing the color symbols of each pixel in FIG. 5(A)

The perimeter pixel data is input from the line buffer 10 into the priority order switching unit 19. This perimeter pixel data includes pixels P0, P1, P2 and P3 on the perimeter of the target pixel X as shown in FIG. 5(A). The reference pixels A, B, C, and D in the Markov model (FIG. 4(A)) are such that B=P1, C=P2 and D=P3 so that only pixel A is different.

Figure 5B:
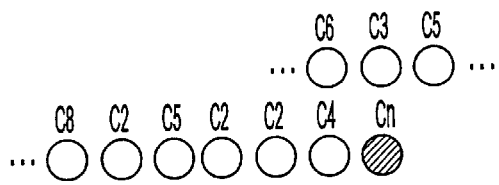

The priority order switching unit 19 changes the priority order based on a predetermined switching command in order to generate the two-dimensional color order table 20. However, the order and position of P0, P1, P2 and P3 are fixed as shown in FIGS. 5 and 7. A method may be used that employs a prescan for the image that is the target of encoding. The priority order pattern for perimeter pixels for which a good compression ratio is obtained is determined beforehand and the number of times the color symbols coincide during encoding and decoding is calculated. A switching command is output such that pixels in orders with a large number of matches are carried to upper orders.

The two-dimensional color order table 20 (FIG. 6) which constitutes the upper part of the color order table in the prediction table combining unit 18 is created based on the command from the priority order switching unit 19. The color order table in the prediction table combining unit 18 (FIG. 8) is a latest appearance table. The upper four orders (the 0th order through the third order) are found from the two-dimensional color order table 20. The two-dimensional color order table 20 is stored in a memory (not shown).

When the color pixel data 100A is input into the table updating unit 21, the table updating unit 21 searches the one-dimensional color order table 22 stored in memory and creates the latest appearance table by raising the color order of the color symbol corresponding to the input color pixel data to the 0th order. For example, when the color symbol C4 in the T0 position (FIG. 5) is input, the table updating unit 21 searches the one-dimensional color order table 22, extracts the pertinent color symbol C4, raises the color order of this color symbol C4 to the 0th order, successively lowers the order of the color symbol C2 from the 0th order to the first order and lowers the order of the color symbol C0 from the first order to the second order. This updated one-dimensional color order table 22 is stored in the memory (not shown).

The one-dimensional color order generation unit 17 may include a FIFO unit made of 256 registers. However, in this configuration, only the top 32 orders (the 0th order through the 31st order) are included in a FIFO unit made up of registers in order to increase processing speed and to create a complete latest appearance table. On the other hand, orders from the 32nd order through the 255th order are included in a 224 byte dual port RAM. When the pertinent color symbol is in the nth order of the 32nd order or lower, the pertinent color symbol is advanced to the 0th order while switching that which was at the 31st order (number 32) to the nth order. The reason the orders from the 32nd order upward are included in this dual port RAM is to boost the processing speed through parallel processing. This may include a single port RAM when lower cost and compactness are particularly taken into consideration.

Data of the two-dimensional color order table and data of the one-dimensional color order table are input into the prediction table combining unit 18 to create the color order table 23 which is one type of latest appearance table such as shown in FIG. 8. This color order table 23 includes perimeter pixels with the 0th order through the third order corresponding to the two-dimensional color order table 20. For example, when the colors of the perimeter pixels P0, P1, P2 and P3 all differ, these pixels occupy the 0th through third order. On the other hand, when P0 through P3 are all the same color, these pixels occupy only the 0th order and the color which is in the first order of the one-dimensional color order table 21 is in the first order of this color order table 23.

This color order table 23 is such that the 0th order is the 0th order of the two-dimensional color order table 20 and moreover is also the 0th order of the one-dimensional color order table 22. After the 255th order (i.e., number 256 from the top), an escape symbol is attached as the code. Concretely, the escape symbol expressed as "11111111" and code indicating "0" expressed as "00000000" are output in the 255th order. In addition, in the 256th order, the same escape symbol of "11111111" is output along with code indicating "1" expressed as "00000001".

Thus, the combined color order table 23 is created without deleting overlapping portions of the one-dimensional color order table 22 and values of the two-dimensional color order table 20 which are the values of the perimeter pixels. Accordingly, a comparison is unnecessary to perform deletion and the speed is increased. While the deterioration of the compression ratio may be 1% or less in comparison with conventional models, the processing speed is increased at least two-fold. In addition, the number of bits of code for the color order may be increased making a correspondence without using this kind of escape symbol, but in this case the efficiency of encoding is greatly reduced because of the increase in number of bits. In contrast, use of escape symbols is extremely beneficial because there is substantially no deterioration of the compression ratio.

Data of the combined color order table 23 is output to the determination device 15 that compares data of the combined color order table 23 and color symbols of the color pixel data 100A that is to be encoded, and outputs the color order data 120 corresponding to the color pixel data 100A that is to be encoded.

The entropy encoder 12 receives the prior status signal Cx and this color order data 120 and outputs the encoding data 200.

Figure 10:
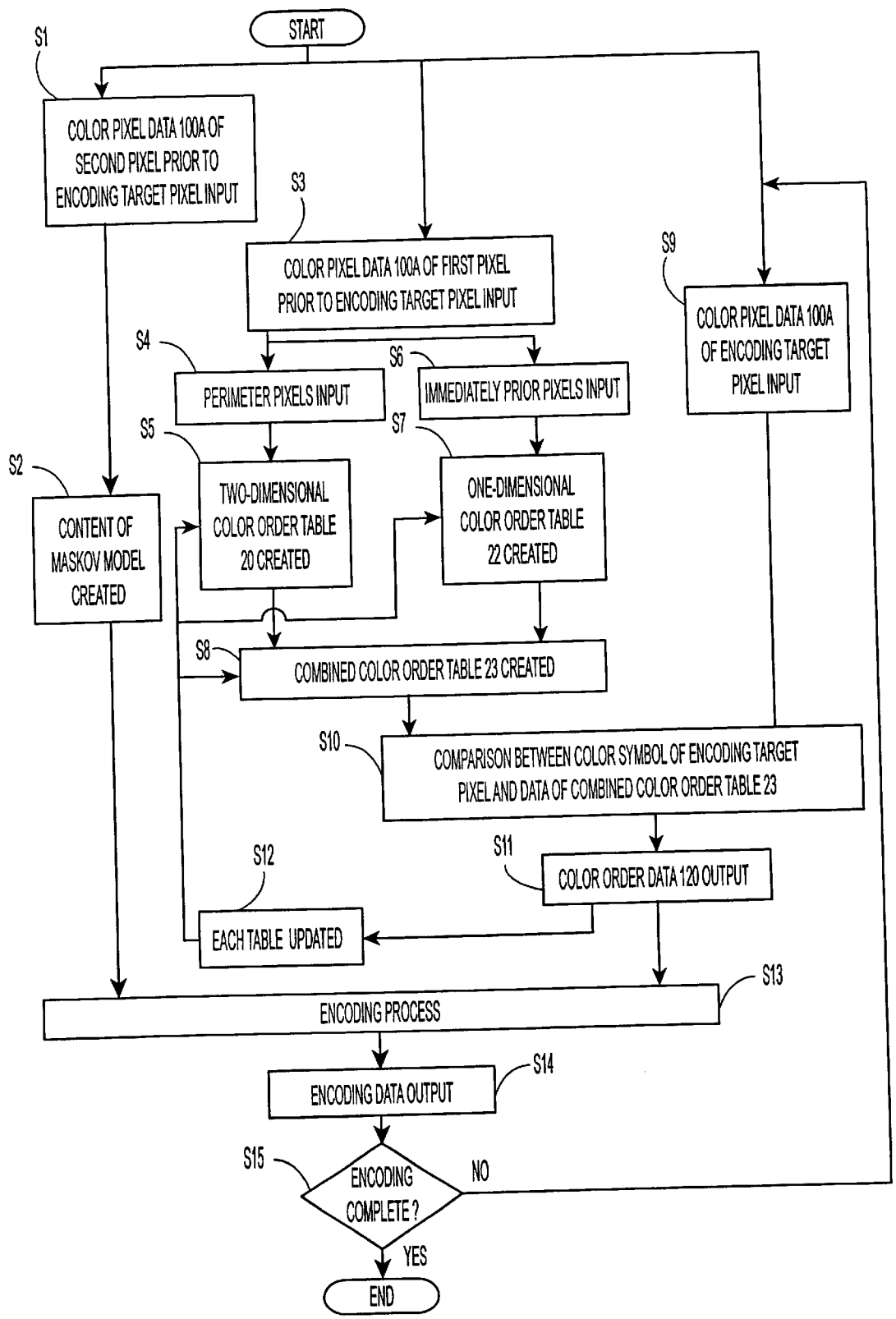
FIG. 10 is a flowchart showing the encoding action in the encoding system.

Actions of the encoding system 1 will now be described with reference to FIG. 10. First, actions of normal cases will be described, and then exception processes for the edge portions of each of the strips L1 to L6 will be described.

In an encoding process, the color pixel data 100A of the second pixel prior to target pixel has already been input (step S1). The context of the Markov model is created (step S2) by the Markov model creation unit 11 from this data and data of the three reference pixels on the line above the target pixel.

Color order transformation is accomplished in parallel with this context creation process. That is to say, data of one pixel prior to the target pixel has already been input (step S3) and inputting of the perimeter pixels is completely finished (step S4) by inputting of this pixel so that the two-dimensional color order table 20 is created (step S5). On the other hand, the input of the data of one pixel prior to the target pixel is the same as the immediately prior pixel that was input into the one-dimensional color order generation unit 17 (step S6). Using this input, the one-dimensional color order table 22 is created (step S7).

Data from the two-dimensional color order table 20 and the one-dimensional color order table 22 are input to the prediction table combining unit 18 and the combined color order table 23 is created (step S8). At this time, an escape symbol (="11111111") and respectively differing numbers (0 to 3) are attached to all of the color symbols below the 255th order (number 256).

Next, the color pixel data 100A that is the target of encoding is input (step S9), and compared to data of the combined color order table 23 (step S10). When the color pixel data 100A differs from that in the two-dimensional color order table 20, the portion corresponding to the one-dimensional color order table 22 is searched and the pertinent color symbol is found. Furthermore, when that color symbol is, for example, in the 10th order (number 11) of the one-dimensional color order table 22, assuming that the order in the two-dimensional color order table 20 is 4, three is added and the color order data 120 that is the 13th order is output (step 11). Thus, an actual search is accomplished for the two-dimensional color order table 20 and the one-dimensional color order table 22 and when the color symbol is found in the two-dimensional color order table 20, the order is output without change, while when the color symbol is in the one-dimensional color order table 22, this is output after adding a predetermined value.

Figure 9:
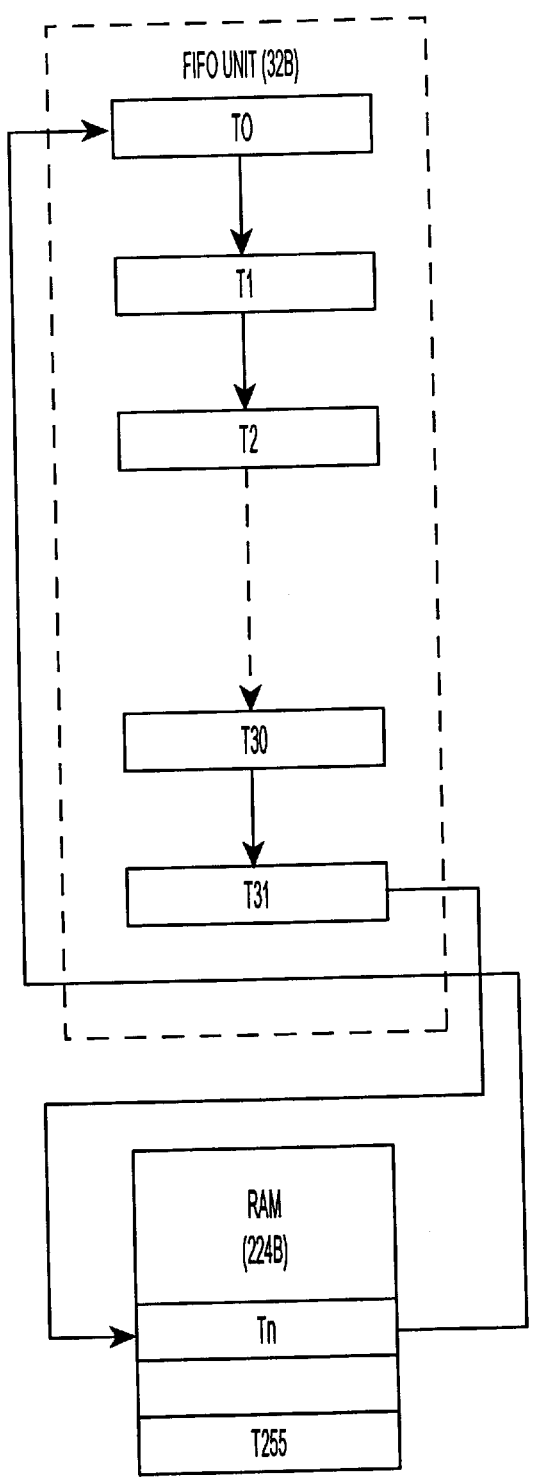
FIG. 9 shows the composition of the one-dimensional color order table and the updating process employed in the encoding system and decoding system.

On the other hand, the pertinent color symbol is brought to the 0th order of the one-dimensional color order table 22, and that color symbol is also brought to the 0th orders of the two-dimensional color order table 20 and the combined color order table 23. This updating operation of each of the tables 20, 22 and 23 is accomplished in step S12. When this occurs, a latest appearance table is created in the lower orders of the one-dimensional color order table 22 and the combined color order table 23 such that the latest item is raised to the 0th order and the other items are all successively lowered by one. However, when the item is from the 32nd order or lower, a switching process is accomplished which brings the item previously in the 31st order to the pertinent order position as shown in FIG. 9.

An encoding process is accomplished (step S13) by the entropy encoder 12 from the output color order data 120 and the context of the Markov model (i.e., the status signal Cx), and the encoding data 200 is output (step S14). Then, a determination is made (step S15) whether encoding has been completed. When encoding is complete, the operation ends; however, while when encoding is not complete, operation returns to step S9.

Now an exception processing for edge portions of each of the strips L1 through L5 will be described.

Figure 11A:
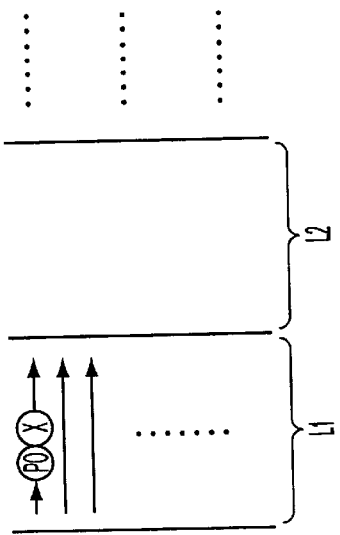
FIGS. 11(A)–(B) show handling of the perimeter pixels used by the two-dimensional color order table in the encoding action with FIG. 11(A) showing the very first encoding target pixel being encoded and FIG. 11(B) showing an encoding target pixel in the first line being encoded.

First, encoding of the first portion of the first strip L1 (i.e., the pixel at the left edge of the uppermost portion) of FIG. 11(A) will be described. First, the color pixel data 100A that is the target of encoding is input (step S9). At this time, the perimeter pixels have not been input, and consequently the two-dimensional color order table 20 is entirely initialized to the item in the 0th order of the one-dimensional color order table 22, while on the other hand, the one-dimensional color order table 22 is also initialized so that the 256 color symbols are arranged in order from the 0th order through the 255th order. Consequently, a table of the 256 color symbols arranged in order from the 0th order through the 255th order exists in the prediction table combining unit 18 as the combined color order table 23. In addition, the line buffer 10 is also initialized to entirely "0" at the start. The color symbol of a value other than "0" may also be used as the initial value of the line buffer 10.

Following this, steps S10, S11, S12, S13, S14 and S15 (FIG. 10) are accomplished and the flowchart then returns to step S9. At this time, in updating the two-dimensional color order table 20 during updating of each table (step S12), a process is executed wherein the color symbol corresponding to the input color pixel is inserted into the position of P0 of the two-dimensional color order table 20. Because P1, P2 and P3 have not yet been created, the initial value "0" of the line buffer 10 becomes the color symbol. On the other hand, in the one-dimensional color order table 22, a move-to-front process is executed that raises that color symbol corresponding to the input color pixel to the 0th order (i.e., create a latest appearance table).

Figure 11B:
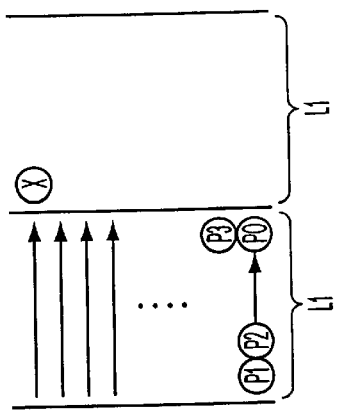

On the uppermost line of the strip L1 shown in FIG. 11(B), only P0 is input as the perimeter pixel. On the other hand, for the one-dimensional color order table 22, creation of a latest appearance table is always accomplished and a process is accomplished for raising the color symbol input most recently to the topmost order. The context of the Markov model is not created for the original item when the first pixel is input, and Cx=0 indicating one color is output as the provisional value as the status signal Cx. The same is also true when the second pixel is input, while the value of A shown in FIG. 4(A) is determined from the point when the third pixel is input, but naturally the original Markov model cannot be created. However, because the color symbol of the pixel one line above, i.e. the index, is initialized to "0" if the color symbol of P0 is "0", the status signal Cx=0 indicating one color is output; however, if the color symbol of P0 is not "0", the status signal Cx=1 indicating two colors is output.

Figure 12A:
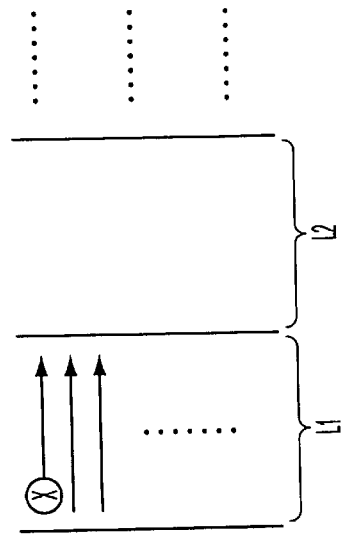
FIGS. 12(A)–(C) show handling of the perimeter pixels used by the two-dimensional color order table in the encoding action of the encoding system with FIG. 12(A) showing encoding when the encoding target pixel has arrived at the start of the second line.

Following this, when the color pixel data 100A of the left edge of the second line of the strip L1 (the 17th pixel) is input, the perimeter pixels P0, P1 and P2 are as shown in FIG. 12(A). That is to say, the first pixel prior to the target pixel X is P0, the 15th prior pixel is P2 and the 16th prior pixel (i.e., the pixel in the same position one line up) is P1. P3 has not yet been created and consequently the process is accomplished with the color symbol "0" inserted.

Figure 12B:
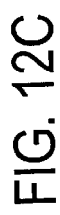
Figure 12C:
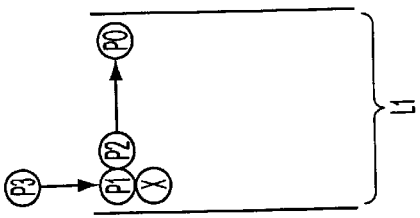

Thus, in this configuration, the perimeter pixels P0 through P3 and the reference pixels A through D are the values of positions a fixed distance from the target pixel X in the line buffer 10. That is to say, as shown in FIG. 12(B) the perimeter pixel P0 is the first prior pixel, the reference pixel A is the second prior pixel, the perimeter pixel P2 (this is also the reference pixel C) is the 15th prior pixel, the perimeter pixel P1 (this is also the reference pixel B) is the 16th prior pixel (i.e., the pixel in the same position the previous line from the target pixel), and the perimeter pixel P3 (this is also the reference pixel D) is the 17th prior pixel. This is the same when the target pixel X and the perimeter pixels are separated into the strips L2 and L1 as shown in FIG. 12(C). Thus, if 17 pixels are stored in the line buffer 10, it is possible to use these as reference pixels and perimeter pixels. In addition, although the simple operation of setting "0" as the initial value of the line buffer 10, a troublesome exception processes such as hypothetically inserting the value "0" are not accomplished. Thus, it is possible to advance from one strip to the next strip using the same process action as normal, without specially implementing a troublesome exception process.

Figure 13:
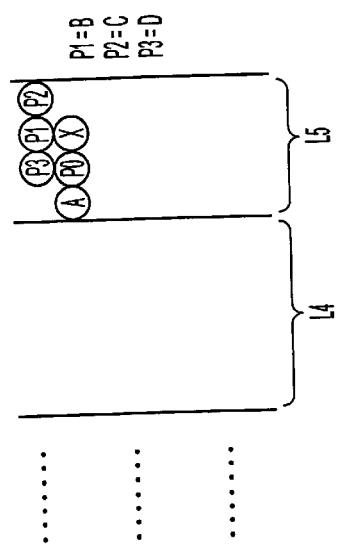
FIG. 13 shows handling of the perimeter pixels used by the two-dimensional color order table and the reference pixels used by the Markov model in the encoding action of the encoding system and showing handing strips of narrow width using the same as with normal strips.

In addition, when the strips are partitioned into horizontal widths of 16 pixels, there are cases where the horizontal width of the last strip L5 is less than 16 pixels as shown in FIG. 3. In that case, when the horizontal width of that strip L5 is four pixels or greater with (n) being the number of pixels in that horizontal width, then P0 is the first pixel prior to the target pixel, reference pixel A is the second prior pixel, perimeter pixel P2 (the reference pixel C) is the (n−1)st prior pixel, perimeter pixel P1 (the reference pixel B) is the (n)th prior pixel, and perimeter pixel P3 (reference pixel D) is the (n+1)st prior pixel as shown in FIG. 13.

Figure 14C:
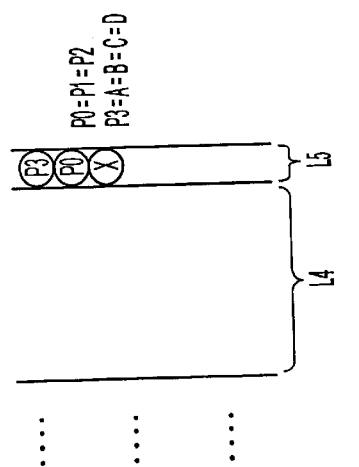
FIGS. 14(A)–(C) show handling of the perimeter pixels used by the two-dimensional color order table and the reference pixels used by the Markov model in the encoding action of the encoding system with FIG. 14(A) showing the horizontal width is 3 pixels, FIG. 14(B) showing when the horizontal width is 2 pixels, and FIG. 14(C) showing when the horizontal width is 1 pixel.
Figure 14B:
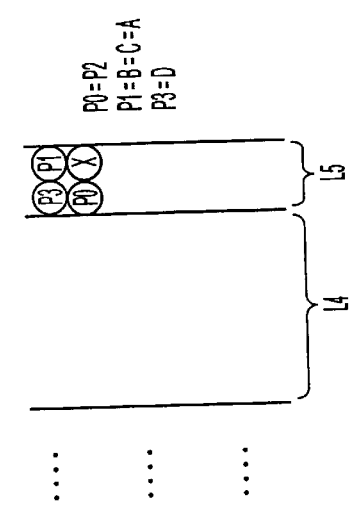
Figure 14A:
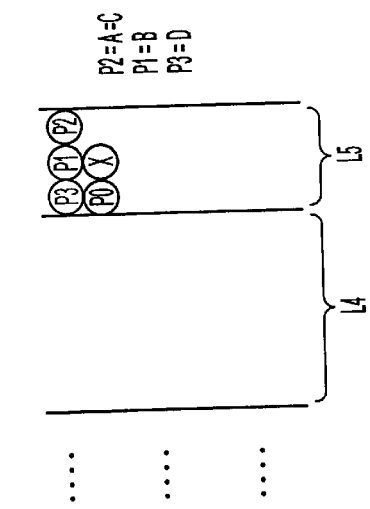

When the horizontal width of the strip L5 is 3 pixels, reference pixel A becomes the same as the reference pixel C and both are in the location of the perimeter pixel P2, as shown in FIG. 14(A). The remainder have the same relationship as when the horizontal width is four pixels. When the horizontal width of strip L5 is 2 pixels, the first pixel prior to the target pixel becomes P0, the second prior pixel becomes P1 and the third prior pixel becomes P3 as shown in FIG. 14(B). In this example, P2 becomes the (2−1) prior pixel (i.e., the first prior pixel) and has the same value as P0. However, reference pixel C corresponding to P2 cannot be the first prior pixel and instead becomes the position of P1. Consequently, the reference pixels B, C and A are all at the position of P1. Furthermore, when the horizontal width of the strip L5 is one pixel, by similarly applying the relationships of FIG. 13, the first prior pixel becomes P0, P1 and P2, and the second prior pixel becomes P3. Here, the reference pixels A, B, C and D are all the same and at the position of P3.

When the above-described exception processes are accomplished for an edge portion, the portions which are lacking in the positional relationships of the perimeter pixels and reference pixels are hypothetically set to "0". For strips less than a 16 pixel horizontal width, the processing is more efficient than cases of processing by making the horizontal width to be 16 pixels. In addition, it is possible to easily deal with images having a horizontal width with an arbitrary number of pixels.

The decoding system 3 of a multi-color image corresponding to the encoding system 1 will now be described with reference to FIG. 2.

The decoding system 3 may include a line buffer 30 (including a perimeter pixel generation device and a reference pixel generation device), a Markov model generation unit 31 (i.e., a degeneracy device), an entropy decoder 32 and a prediction apparatus 33. The decoding system is composed such that the data stream of the encoding data 200 is transformed into a data stream of color pixel data 100B and output. The algorithm of the decoding system 3 is the reverse of the algorithm of the encoding system 1. Accordingly, the data stream and bit composition of the color pixel data 100A and the color pixel data 100B are the same.

The prediction apparatus 33 may have has the same composition as the prediction apparatus 13 in the encoding system 1. That is, the prediction apparatus 33 may include a color order generation unit 14 and a determination unit 15 that also functions as an escape symbol generation device. In addition, the color order generation unit 14 includes a two-dimensional color order generation unit 16 for determining the upper color order, a one-dimensional color order generation unit 17 for determining the lower color order and a prediction table combining unit 18 for generating a color order table 23 by combining outputs from the two generation units 16 and 17. Furthermore, the two-dimensional color order generation unit 16 includes a priority order switching unit 19 and a two-dimensional color order table 20. The one-dimensional color order generation unit 17 includes a table updating unit 21 and a one-dimensional color order table 22.

The line buffer 30 (similar to the line buffer 10 of the encoding system 1) can store at least 17 pixels worth of data. Those values are output to the two-dimensional color order generation unit 16 as perimeter pixels and the two-dimensional color order table 20 is created. Those values are also output to the Markov model generation unit 31 as reference pixels and a status signal Cx is generated.

The entropy decoding apparatus 32 uses the status signal Cx and performs a decoding operation on the input encoding data 200 in the reverse order as the entropy encoder 12, to transform this data into the color order data 120 which is output to the prediction apparatus 33. The entropy decoding apparatus 32 uses an algorithm that is reverse to that used in the entropy encoder 12. Accordingly, when an arithmetic encoding apparatus is used in the entropy encoder 12, the entropy decoding apparatus 32 is composed as an arithmetic decoding apparatus with the same composition. In addition, when a Huffman encoding apparatus is used in the entropy encoder 12, the entropy decoding apparatus 32 is composed as a Huffman decoding apparatus with the same composition. Thus, the encoding data 200 can be accurately transformed into and output as the color order data 120 paired therewith.

The prediction apparatus 33 functions as a prediction device. The same combined color order table 23 is set therein and the corresponding color symbols from the color order table 23 are decoded and output as the color pixel data 100B based on the input color order data 120 and the perimeter pixel data.

Figure 15:
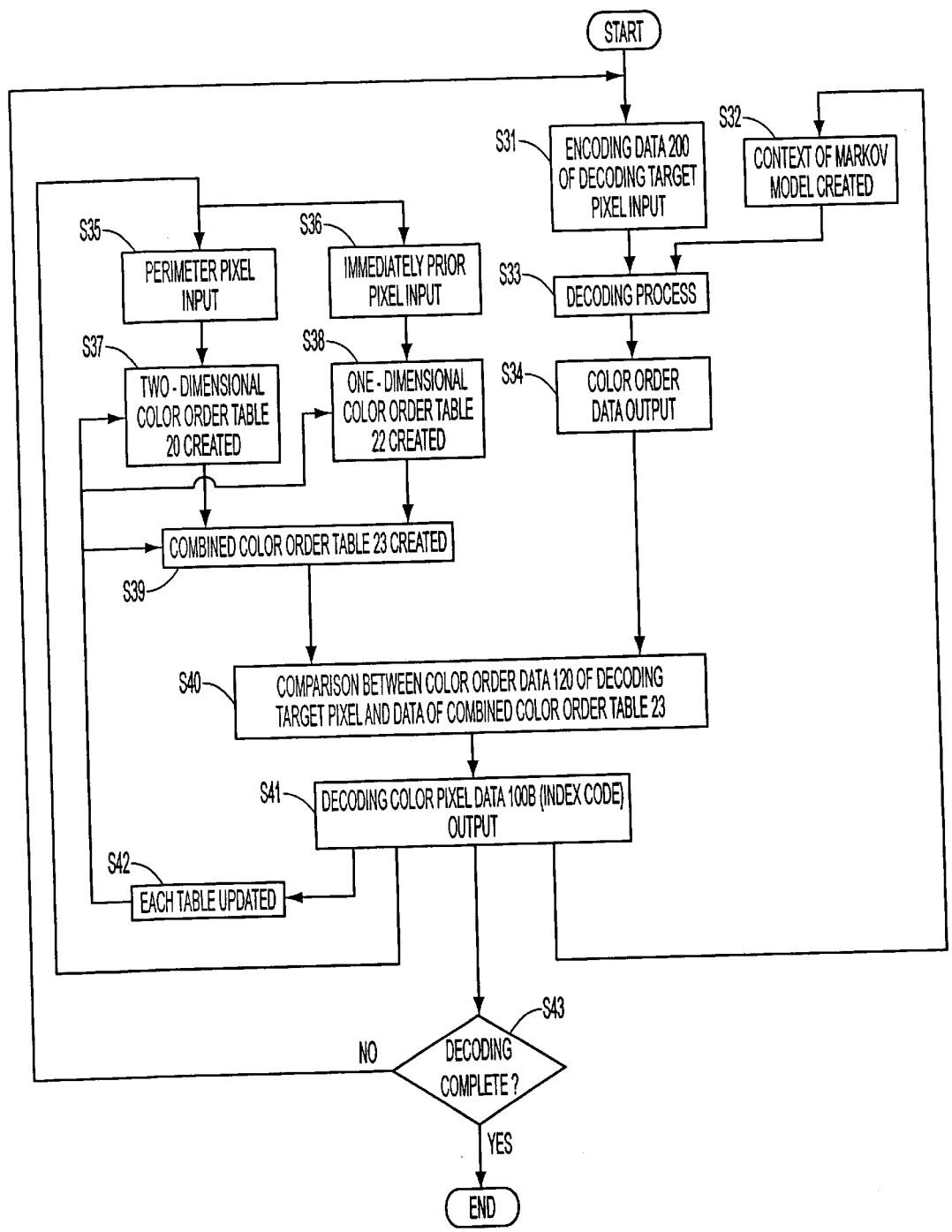
FIG. 15 shows the decoding action in the decoding system.
Figure 16A:
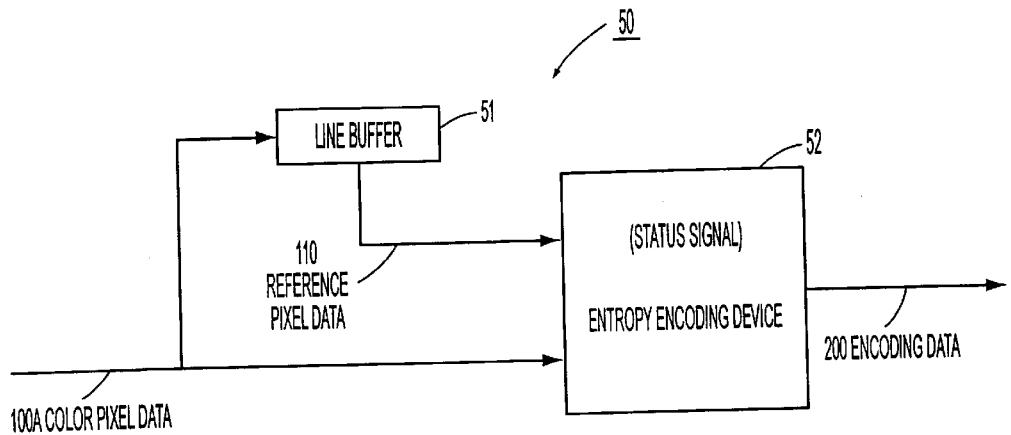
FIGS. 16(A)–(B) show a conventional multi-color image encoding system and decoding system.
Figure 16B:
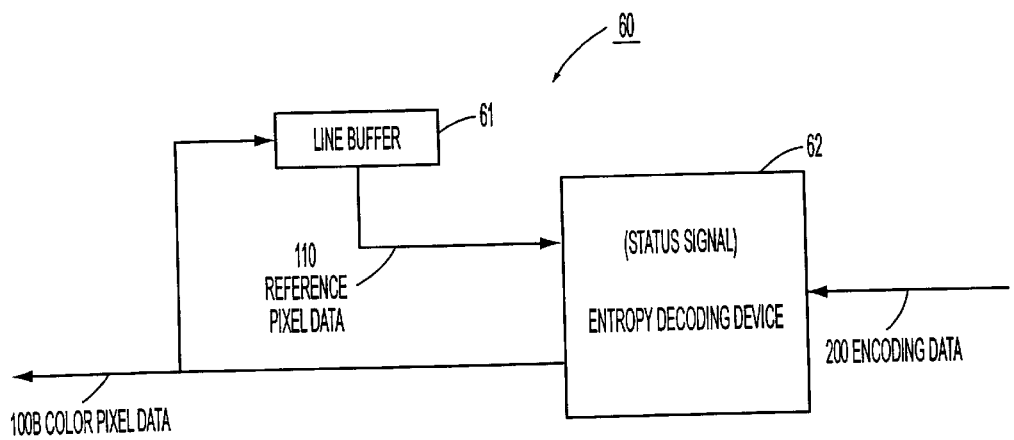
Figures 17, 18:
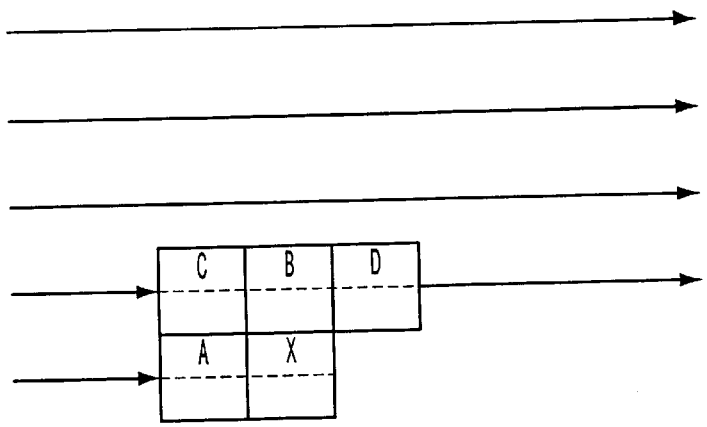
FIG. 17 shows the reference pixel data with respect to encoding target pixel data conventionally.
FIG. 18 shows a conventional parameter table.
Figure 19A:
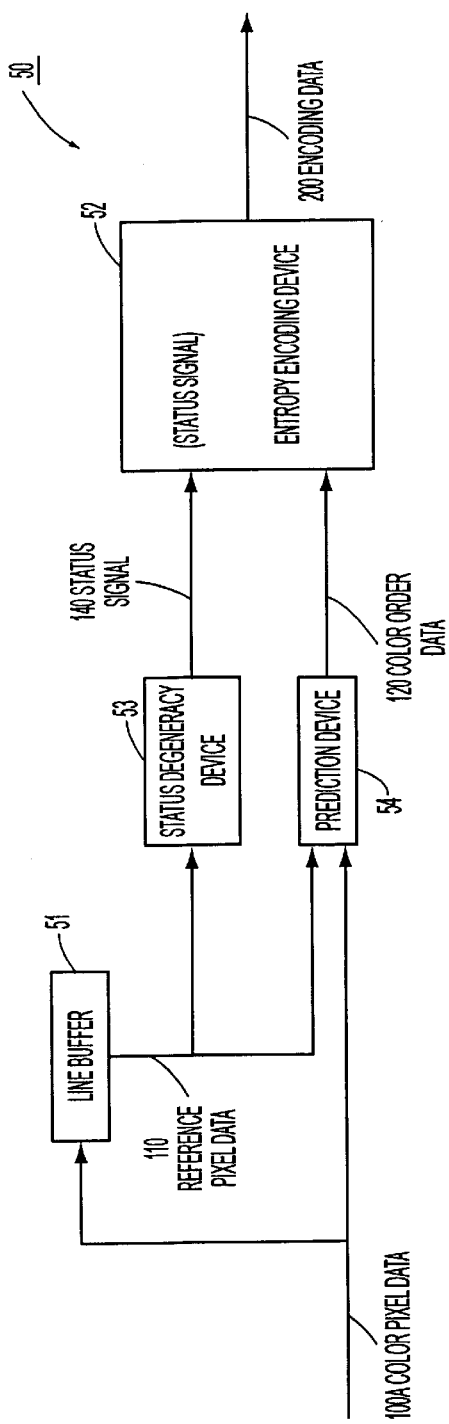
FIGS. 19(A)–(B) show a conventional multi-color image encoding system and decoding system having a status degeneracy device.
Figure 19B:
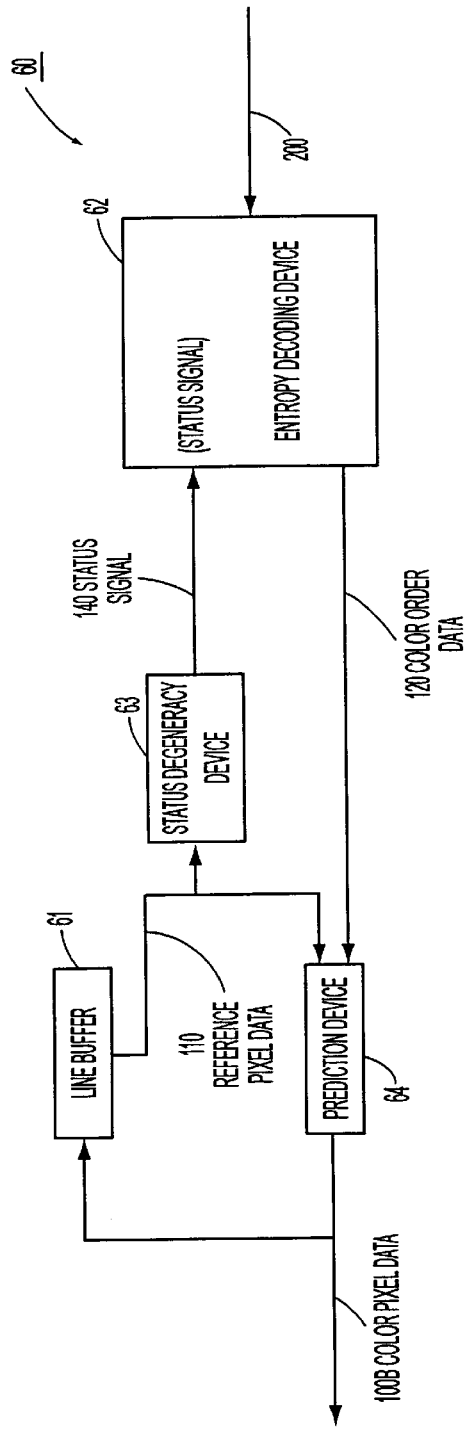

Actions of the decoding system 3 will now be described with reference to FIG. 15. First, the encoding data 200 of the decoding target pixel is input to the entropy decoder 32 (step S31). The context of the Markov model is created based on data of the two prior pixels (step S32) and is input as the status signal Cx to the entropy decoding apparatus 32. The entropy decoding apparatus 32 accomplishes a decoding process on the encoding data 200 using the status signal Cx (step S33).

Using the decoding process, the color order data 120 is output (step S34) to the determination unit 15 in the prediction apparatus 33.

On the other hand, the data already decoded as the color pixel data 100B is input into the priority order switching unit 19 as perimeter pixels via the line buffer 30 (step S35) and is input as the immediately previous pixel into the table updating unit 21 (step S36). When the perimeter pixels are input, the two-dimensional color order table 20 is created (step S37). When the immediately prior pixel is input, the one-dimensional color order table 22 is created (step S38).

The two-dimensional color order table 20 may be the same as in FIG. 6 and the one-dimensional color order table 22 may be the same as in FIG. 7. Furthermore, the table updating unit 21 is such that the 0th order to the 31st order is in a FIFO unit that accomplishes a complete move-to-front operation, while the lower orders are made of 224 byte RAM.

The combined color order table 23 is created from the two tables 20 and 22 (step S39). Data of this color order table 23 is input into the determination unit 15 and compared against the color order data 120 (step S40). The color order data may consist of the 63rd order of the code "00111111" and in the case of the 256th order, the escape symbol "11111111" and "00000001". As a result of this comparison, the color pixel data 100B (=index code) of the color symbol in the pertinent order in the combined color order table 23 is output (step S41).

When the code of the second order is output, the color pixel data 100B of the corresponding color symbol is output and an updating process is accomplished (step S42) such that the color symbol in the combined color order table 23 is raised to the 0th order, the symbol in the 0th order is lowered to the first order and the symbol in the first order is lowered to the second order. This updating is accomplished for both the two-dimensional color order table 20 and the one-dimensional color order table 22.

When this updating operation occurs, the two-dimensional color order table 20 is such that the order of P0, P1, P2 and P3 is determined. However, if the decoded item is the same as any of P0, P1, P2 or P3 (i.e., if this is the same as P2 in the second order) then that color symbol is raised to the 0th order. At that time, assuming absolutely no move-to-front process is accomplished for the one-dimensional color order table 22, this becomes different from the one-dimensional color order table 22 during encoding. Consequently, a search is made in the one-dimensional color order table 22 for the same color symbol as the color symbol in the position of the second order in the two-dimensional color order table 22 and that color symbol is raised to the 0th order and a move-to-front process is accomplished which arranges the other items.

At this time, the search of the one-dimensional color order table 22 can be limited to a search of the upper 17 items (the 0th order to the 16th order) in the one-dimensional color order table 22. That is to say, P0 through P3 are one of the latest 17 pixels in the one-dimensional color order table 22. Thus, when the pixel that is decoded is one of P0 through P3, it is enough to compare at most 17 times in updating the one-dimensional color order table 22. Thus, operation is limited to at most 17 times because the image is partitioned into strips with a horizontal width of 16 pixels, and it is possible to limit the number of reference pixels stored in the line buffer 10.

On the other hand, when the pixel that is decoded is not any of P0 through P3, the color order data 120 is output in step S34, when P0 through P3 total four colors, the item corresponding to that color order data 120 is made to correspond to the 153rd order in the one-dimensional color order table 22, and consequently, without searching the color symbol of the 153rd order is directly extracted and raised to the 0th order.

Thus, in the case of decoding, 16 comparisons is extremely small when compared with the number of searches (256×4) used to eliminate redundant colors in Japanese Laid-Open Patent Publication 6-276041 so that an extremely fast process is possible. Searches during decoding may be equivalent to that during encoding, to search all of the one-dimensional color order table 22. However, in terms of high speed processing, the above configuration is preferable.

When the color pixel data 100B is output, a determination is made in step S43 whether decoding has been completed. When there is no further inputting of a new encoding data 200 and the determination is made that decoding has been completed, the operation concludes. On the other hand, when continuing operation, the flowchart returns to step S31. Even in decoding, an exception process relating to the edge portions of the strips and strips with small horizontal width are executed using the same algorithms as shown in FIGS. 11–14.

In this configuration, orders from the 255th order and lower are output as two codes (a total of 16 bits) comprised of an escape symbol and a code indicating the numerical value obtained by subtracting 256 from the total number of orders (counting from the first). Those that have low orders such as 255th order or less display color codes that do not occur frequently. Hence, outputting of two codes does not frequently occur. Moreover, even if these occur, following this these are assigned to easily output orders, and consequently the compression ratio does not deteriorate substantially as discussed above. In comparison to this, the effect of eliminating the sorting process of omitting redundant color code and switching of orders is extremely large.

The Markov model in this configuration differs from that of the conventional art and the pixel immediately prior to the encoding target pixel is not used as a reference pixel. However, deterioration of the compression ratio is kept to several percent. On the other hand, the processing speed is accelerated to nearly double because a pipeline process between the color order transformation and the entropy encoder 12 or the entropy decoding apparatus 32 is possible. In this configuration, the immediately prior pixel is used as a perimeter pixel. However even in cases differing from this configuration, wherein the immediately prior pixel is not used as a perimeter pixel in creating the color order table 23, the deterioration of the compression ratio is kept to around 10% and the processing speed is doubled.

Furthermore, the line buffers 10 and 30 are such that the images are partitioned into strips and consequently it is possible to make these have small capacity. The pixel one line above is viewed as the perimeter pixel used in color order transformation and the reference pixel used in the Markov model, but because the horizontal width is partitioned into strips, the number of pixels that must be stored in order to view the pixel one line above can be reduced. Consequently, it is possible to make the line buffers 10 and 30 more compact, smaller capacity and less costly.

The above-described configuration is the preferred configuration of the embodiment of the present invention and this is intended to be illustrative and not limiting as numerous variations are possible without varying from the scope of the present invention. For example, the color pixel data 100A may be n bit (n an integer two or larger) color pixel data 100A.

In addition, the horizontal width of the strips are preferably 8 to 64 pixels in consideration of the capacities of the line buffers 10 and 30. 16 to 32 pixels is most preferable in consideration of search efficiency and compression efficiency caused by the exception processes at the edge portions. Furthermore, as the composition ratio between the RAM and FIFO portion in the one-dimensional color order generation unit 17, it is preferable for the FIFO portion to include ¼ to ⅟32 of the total and the remainder to be RAM. It is most preferable for the FIFO portion to comprise ⅛ to ⅟16 with the remainder RAM because it is possible to achieve high speed processing without the compression ratio dropping much.

In addition, it is possible to use run length encoding (and decoding) technology or other encoding (and decoding) technologies.

Figures 20A, 20B:
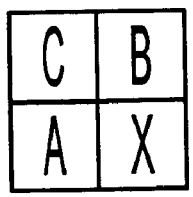
FIGS. 20(A)–(B) show a conventional degeneracy table.

Furthermore, as the context of the Markov model, besides the 4 statuses of one color through four colors, other status signals Cx may be generated such as status signals caused to differ depending on where the differing colors are as shown in FIG. 20.

In addition, in order to make the reference pixels of the Markov model different from the perimeter pixels used in color order transformation, the third prior pixel or greater may be used as a reference pixel besides using the second prior pixel without using the first prior pixel as a reference pixel as in this configuration of the above embodiment. That is to say, the second prior pixel need not be used as a reference pixel in addition to the first prior pixel.

For the Markov model context creation technology, technology may be used of each type of encoding and decoding independently rather than in parallel with the technology which causes color order transformation.

In addition, the image may be read temporarily into memory and then partitioned into strips as shown in FIG. 3. However, it is not necessary to partition this into strips. In addition, the image need not be read into memory but rather may be directly stored in buffer memory using luster scanning.

With the multi-color image encoding apparatus and its method, the speed of the encoding process may be increased with substantially no deterioration of the compression ratio by eliminating a great deal of the operation volume and utilizing a pipeline process.

In addition, with the multi-color image decoding apparatus and the method, the speed of the decoding processes may be increased with substantially no decrease in the decoding efficiency by eliminating a great deal of the operation volume and utilizing a pipeline process.

While the invention has been described in relation to preferred embodiments, many modifications and variations are apparent from the description of the invention, and all such modifications and variations are intended to be within the scope of the present invention as defined in the appended claims.

What is claimed is:

1. A multi-color image encoding apparatus comprising:

prediction means, having a color order table in which a color order of each color symbol is established, for reading from the color order table and outputting the color order of the color symbol corresponding to target color pixel data to which an index code consisting of a plurality of bits is attached from the color order table;

perimeter pixel generation means for outputting two-dimensional perimeter pixel data for the target color pixel data based on input color pixel data;

entropy encoding means for transforming the color order data and outputting encoding data, wherein the color order table is created by combining a two-dimensional color order table that establishes the color order for the color symbols of each pixel of said two-dimensional perimeter pixel data, the color orders being used as upper color orders, and a one-dimensional color order table for lower color orders that establishes a predetermined number of color orders for the color symbols corresponding to the color pixel data that is input ahead of the target color pixel data, the combined color order table being generated by creating a latest appearance table that moves the color order of the color symbols corresponding to the color pixel data most recently input to an uppermost line; and escape symbol generation means for outputting escape symbols for the orders corresponding to the color symbols below the order of a predetermined number when a total number of color symbols in the upper color order and in the lower color order exceeds the predetermined number.

2. The multi-color image encoding apparatus of claim 1, wherein the uppermost line of said two-dimensional color order table and the uppermost line of said one-dimensional color order are the color symbols of the image input immediately before said target color pixel data, and the resulting color symbols are placed in the uppermost line of said combined color order table.

3. The multi-color image encoding apparatus of claim 1, wherein if said bit number is denoted by x, then the number of color symbols in said one-dimensional color order table becomes $2^x$, and the $(2^x+n)$th (n: integer) symbol from the top is represented by the escape symbol in x bits and x-bit symbols denoting "n" when the number of orders of said combined color order table exceeds $2^x$.

4. The multi-color image encoding apparatus of claim 1, further comprising degeneracy means for classifying and degenerating conditions of pixels surrounding said target color pixel data into a plurality of reference pixel patterns, wherein the reference pixels are made different from the perimeter pixels for said two-dimensional color order table.

5. A multi-color image encoding apparatus comprising:

prediction means, having a color order table in which a color order of each color symbol is established, for reading from the color order table and outputting the color order of the color symbol corresponding to target color pixel data to which an index code consisting of a plurality of bits is attached from the color order table;

perimeter pixel generation means for outputting two-dimensional perimeter pixel data for the target color pixel data based on input color pixel data; and entropy encoding means for transforming the color order data and outputting encoding data, wherein the color order table is created by combining a two-dimensional color order table that establishes the color order for the color symbols of each pixel of said two-dimensional perimeter pixel data, the color orders being used as upper color orders, and a one-dimensional color order table for lower color orders that establishes a predetermined number of color orders for the color symbols corresponding to the color pixel data that is input ahead of the target color pixel data, the combined color order table being generated by creating a latest appearance table that moves the color order of the color symbols corresponding to the color pixel data most recently input to an uppermost line, wherein when color symbols in the two-dimensional color order table overlap color symbols in the one-dimensional color order table, the overlapped color symbols are not deleted from the one-dimensional color table.

6. The multi-color image encoding apparatus of claim 5, wherein the uppermost line of said two-dimensional color order table and the uppermost line of said one-dimensional color order are the color symbols of the image input immediately before said target color pixel data, and the resulting color symbols are placed in the uppermost line of said combined color order table.

7. The multi-color image encoding apparatus of claim 5, further comprising degeneracy means for classifying and degenerating conditions of pixels surrounding said target color pixel data into a plurality of reference pixel patterns, wherein the reference pixels are made different from the perimeter pixels for said two-dimensional color order table.

8. A multi-color image encoding apparatus comprising:

prediction means, having a color order table in which a color order of each color symbol is established, for reading from the color order table and outputting the color order of the color symbol corresponding to target color pixel data to which an index code consisting of a plurality of bits is attached from the color order table;

perimeter pixel generation means for outputting two-dimensional perimeter pixel data for the target color pixel data based on input color pixel data;

entropy encoding means for transforming the color order data and outputting encoding data, wherein the color order table is created by combining a two-dimensional color order table that establishes the color order for the color symbols of each pixel of said two-dimensional perimeter pixel data, the color orders being used as upper color orders, and a one-dimensional color order table for lower color orders that establishes a predetermined number of color orders for the color symbols corresponding to the color pixel data that is input ahead of the target color pixel data, the combined color order table being generated by creating a latest appearance table that moves the color order of the color symbols corresponding to the color pixel data most recently input to an uppermost line; and degeneracy means for classifying and degenerating conditions of pixels surrounding said target color pixel data into a plurality of reference pixel patterns, wherein the reference pixels are made different from the perimeter pixels for said two-dimensional color order table.

9. A multi-color image encoding method comprising:

a prediction step for reading from a color order table in which a color order of each color symbol is established and outputting the color order of the color symbol corresponding to target color pixel data to which an index code consisting of a plurality of bits is attached from the color order table;

a perimeter pixel generation step for outputting two-dimensional perimeter pixel data for the target color pixel data based on input color pixel data;

an entropy encoding step for transforming the color order data and outputting encoding data, wherein the color order table is created by combining a two-dimensional color order table that establishes the color order for the color symbols of each pixel of said two-dimensional perimeter pixel data, the color orders being used as upper color orders, and a one-dimensional color order table for lower color orders that establishes a predetermined number of color orders for the color symbols corresponding to the color pixel data that is input ahead of the target color pixel data, the combined color order table being generated by creating a latest appearance table that moves the color order of the color symbols corresponding to the color pixel data most recently input to an uppermost line; and an escape symbol generation step for outputting escape symbols for the orders corresponding to the color symbols below the order of a predetermined number when the total number of color symbols in the upper color order and in the lower color order exceeds the predetermined number.

10. The multi-color image encoding method of claim 9, wherein the uppermost line of said two-dimensional color order table and the uppermost line of said one-dimensional color order are the color symbols of the image input immediately before said target color pixel data, and the resulting color symbols are placed in the uppermost line of said combined color order table.

11. The multi-color image encoding method of claim 9, wherein if said bit number is denoted by x, then the number of color symbols in said one-dimensional color order table becomes $2^x$, and the $(2^x+n)$th (n: integer) symbol from the top is represented by the escape symbol in x bits and x-bit symbols denoting "n" when the number or orders of said combined color order table exceeds $2^x$.

12. The multi-color image encoding method of claim 9, further comprising a degeneracy step for classifying and degenerating conditions of pixels surrounding said target color pixel data into a plurality of reference pixel patterns, wherein the reference pixels are made different from the perimeter pixels for said two-dimensional color order table.

13. A multi-color image encoding method comprising:

a prediction step for reading from a color order table in which a color order of each color symbol is established and outputting the color order of the color symbol corresponding to target color pixel data to which an index code consisting of a plurality of bits is attached from the color order table;

a perimeter pixel generation step for outputting two-dimensional perimeter pixel data for the target color pixel data based on input color pixel data;

an entropy encoding step for transforming the color order data and outputting encoding data, wherein the color order table is created by combining a two-dimensional color order table that establishes a color order for the color symbols of each pixel of said two-dimensional perimeter pixel data, the color order being used as upper color orders, and a one-dimensional color order table for lower color orders that establishes a predetermined number of color orders for the color symbols corresponding to the color pixel data that is input ahead of the target color pixel data, the combined color order table being generated by creating a latest appearance table that moves the color order of the color symbols corresponding to the color pixel data most recently input to an uppermost line, wherein when the color symbols in the two-dimensional color order table overlap color symbols in the one-dimensional color order table, the overlapped color symbols are not deleted from the one-dimensional color table.

14. The multi-color image encoding method of claim 13, wherein the uppermost line of said two-dimensional color order table and the uppermost line of said one-dimensional color order are the color symbols of the image input immediately before said target color pixel data, and the resulting color symbols are placed in the uppermost line of said combined color order table.

15. The multi-color image encoding method of claim 13, further comprising a degeneracy step for classifying and degenerating conditions of pixels surrounding said target color pixel data into a plurality of reference pixel patterns, wherein the reference pixels are made different from the perimeter pixels for said two-dimensional color order table.

16. A multi-color image encoding method comprising:

a prediction step for reading from a color order table in which a color order of each color symbol is established and outputting the color order of the color symbol corresponding to target color pixel data to which an index code consisting of a plurality of bits is attached from the color order table;

a perimeter pixel generation step for outputting two-dimensional perimeter pixel data for the target color pixel data based on input color pixel data;

an entropy encoding step for transforming the color order data and outputting encoding data, wherein the color order table is created by combining a two-dimensional color order table that establishes the color order for the color symbols of each pixel of said two-dimensional perimeter pixel data, the color order being used as upper color orders, and a one-dimensional color order table for lower color orders that establishes a predetermined number of color orders for the color symbols corresponding to the color pixel data that is input ahead of the target color pixel data, the combined color order table being generated by creating a latest appearance table that moves the color order of the color symbols corresponding to the color pixel data most recently input to an uppermost line; and a degeneracy step for classifying and degenerating conditions of pixels surrounding said target color pixel data into a plurality of reference pixel patterns, wherein the reference pixels are made different from the perimeter pixels for said two-dimensional color order table.

17. A multi-color image decoding apparatus comprising:

entropy decoding means for transforming input target encoding data and outputting color order data;

prediction means, having a color order table in which a color order of each color symbol is established, for reading from the color order table and outputting color symbols corresponding to target color pixel data composed of a plurality of bits;

perimeter pixel generation means for outputting two-dimensional perimeter pixel data for the target color pixel data based on the color pixel data being decoded, wherein the color order table is created by combining a two-dimensional color order table that establishes the color order for color symbols of each pixel of said two-dimensional perimeter pixel data, the color orders being used as upper color orders, and a one-dimensional color order table for lower color orders that establishes a predetermined number of color orders for the color symbols corresponding to the color pixel data that is output ahead of the target color pixel data, the combined color order table being generated by creating a latest appearance table that moves the color order of color symbols specified by the color order most recently input to an uppermost line, wherein the target encoding data is decoded and output as the color pixel data using the color order data corresponding to the target encoding data; and determination means that outputs index codes of the color symbols as color pixel data whose order are below a predetermined number in the combined color order table when escape symbols indicating that the order corresponding to the color symbols is below the predetermined number.

18. A multi-color image decoding apparatus comprising:

entropy decoding means for transforming input target encoding data and outputting color order data;

prediction means, having a color order table in which a color order of each color symbol is established, for reading from the color order table and outputting color symbols corresponding to the color order data input as the target color pixel data composed of a plurality of bits; and perimeter pixel generation means for outputting two-dimensional perimeter pixel data for the target color pixel data based on the color pixel data being decoded, wherein the color order table is created by combining a two-dimensional color order table that establishes the color order for color symbols of each pixel of said two-dimensional perimeter pixel data, the color order being used as upper color orders, and a one-dimensional color order table for the lower color orders that establishes the predetermined number of color orders for the color symbols corresponding to the color pixel data which is output ahead of the target color pixel data, the combined color order table being generated by creating a latest appearance table that moves the color order of color symbols specified by the color order most recently input to an uppermost line, wherein the target encoding data is decoded and output as color pixel data using the color order data corresponding to the target encoding data, wherein when color symbols in the two-dimensional color order table overlap color symbols in the one-dimensional color order table, the overlapped color symbols are not deleted from the one-dimensional color table.

19. A multi-color image decoding apparatus comprising:

entropy decoding means for transforming input target encoding data and outputting color order data;

prediction means, having a color order table in which the color order of each color symbol is established, for reading from the color order table and outputting color symbols corresponding to color order data being input as the target color pixel data composed of a plurality of bits;

perimeter pixel generation means for outputting two-dimensional perimeter pixel data for the target color pixel data based on the color pixel data being decoded, wherein the color order table is created by combining a two-dimensional color order table that establishes the color order for color symbols of each pixel of said two-dimensional perimeter pixel data, the color order being used as upper color orders, and a one-dimensional color order table for lower color orders that establishes a predetermined number of color orders for the color symbols corresponding to the color pixel data that is output ahead of the target color pixel data, the combined color order table being generated by a latest appearance table that moves the color order of color symbols specified by the color order most recently input to an uppermost line, wherein the target encoding data is decoded and output as the color pixel data using the color order data corresponding to the target encoding data; and degeneracy means for classifying and degenerating conditions of pixels surrounding said target color pixel data into a plurality of reference pixel patterns, wherein the reference pixels are different from the perimeter pixels for said two-dimensional color order table.

20. A multi-color image decoding method comprising:

an entropy decoding step for transforming and outputting input target encoding data as color order data;

a prediction step for reading from a color order table in which a color order of each color symbol is established and outputting color symbols corresponding to color order data being input as the target color pixel data composed of a plurality of bits;

a perimeter pixel generation step for outputting two-dimensional perimeter pixel data for the target color pixel data based on the color pixel data being decoded, wherein the color order table is created by combining a two-dimensional color order table that establishes the color order for color symbols of each pixel of said two-dimensional perimeter pixel data, the color orders being used as upper color orders, and a one-dimensional color order table for lower color orders that establishes a predetermined number of color orders for the color symbols corresponding to the color pixel data that is output ahead of the target color pixel data, the combined color order table being generated by creating a latest appearance table that moves the color order of color symbols specified by the color order most recently input to an uppermost line, wherein the target encoding data is decoded and output as color pixel data using the color order data corresponding to the target encoding data; and a determination step that outputs index codes of the color symbols as color pixel data whose order are below a predetermined number in the combined color order table when escape symbols indicating that the order corresponding to the color symbols is below the predetermined number.

21. A multi-color image decoding method comprising:

an entropy decoding step for transforming and outputting target encoding data as color order data;

a prediction step for reading from a color order table in which a color order of each color symbol is established and outputting color symbols corresponding to the color order data being input as the target color pixel data composed of a plurality of bits;

a perimeter pixel generation step for outputting two-dimensional perimeter pixel data for the target color pixel data based on the color pixel data being decoded, wherein the color order table is created by combining a two-dimensional color order table that establishes the color order for the color symbols of each pixel of said two-dimensional perimeter pixel data, the color orders being used as upper color orders, and a one-dimensional color order table for lower color orders that establishes a predetermined number of color orders for the color symbols corresponding to the color pixel data that is output ahead of the target color pixel data, the combined color order table being generated by creating a latest appearance table that moves the color order of color symbols specified by the color order most recently input to an uppermost line, wherein the target encoding data is decoded and output as the color pixel data using the color order data corresponding to the target encoding data, wherein when color symbols in the two-dimensional color order table overlap color symbols in the one-dimensional color order table, the overlapped color symbols are not deleted from the one-dimensional color table.

22. A multi-color image decoding method comprising:

an entropy decoding step for transforming and outputting target encoding data as color order data;

a prediction step for reading from a color order table in which a color order of each color symbol is established and outputting color symbols corresponding to color order data being input as the target color pixel data composed of a plurality of bits;

a perimeter pixel generation step for outputting two-dimensional perimeter pixel data for the target color pixel data based on the color pixel data being decoded, wherein the color order table is created by combining a two-dimensional color order table that establishes the color order for color symbols of each pixel of said two-dimensional perimeter pixel data, the color orders being used as upper color orders, and a one-dimensional color order table for lower color orders that establishes a predetermined number of color orders for the color symbols corresponding to the color pixel data that is output ahead of the target color pixel data, the combined color order table being generated by creating a latest appearance table that moves the color order of color symbols specified by the color order most recently input to an uppermost line, wherein the target encoding data is decoded and output as color pixel data using the color order data corresponding to the target encoding data; and a degeneracy step for classifying and degenerating conditions of pixels surrounding said target color pixel data into a plurality of reference pixel patterns, wherein the reference pixels are made different from the perimeter pixels for said two-dimensional color order table.

* * * * *